US012488448B2

(12) United States Patent
Freerksen

(10) Patent No.: US 12,488,448 B2
(45) Date of Patent: Dec. 2, 2025

(54) MACHINE VISION SYSTEM WITH OBJECTIVE LENS AND COLLISION PROTECTION

(71) Applicant: Mitutoyo Corporation, Kanagawa-ken (JP)

(72) Inventor: Isaiah Freerksen, Bothell, WA (US)

(73) Assignee: MITUTOYO CORPORATION, Kanagawa-Ken (JP)

( * ) Notice: Subject to any disclaimer, the term of this patent is extended or adjusted under 35 U.S.C. 154(b) by 181 days.

(21) Appl. No.: 18/356,048

(22) Filed: Jul. 20, 2023

(65) Prior Publication Data
US 2025/0029228 A1   Jan. 23, 2025

(51) Int. Cl.
| | |
|---|---|
| H04N 5/335 | (2011.01) |
| G06T 7/00 | (2017.01) |
| H04N 23/55 | (2023.01) |
| H04N 23/695 | (2023.01) |

(52) U.S. Cl.
CPC ........... *G06T 7/0004* (2013.01); *H04N 23/55* (2023.01); *H04N 23/695* (2023.01); *G06T 2207/30164* (2013.01)

(58) Field of Classification Search
CPC .......................................... G06T 2207/30164
See application file for complete search history.

(56) References Cited

U.S. PATENT DOCUMENTS

| | | |
|---|---|---|
| 4,136,458 A | 1/1979 | Bell et al. |
| 4,153,998 A | 5/1979 | McMurtry |
| 4,177,568 A | 12/1979 | Werner et al. |

(Continued)

FOREIGN PATENT DOCUMENTS

| | | |
|---|---|---|
| CN | 102436062 A | 5/2012 |
| DE | 2013639 B1 | 5/1971 |

(Continued)

OTHER PUBLICATIONS

Lambda, "Zygo Nexview™," Manual No. SB-0346A, Mar. 2014, URL=https://www.lambdaphoto.co.uk/pdfs/Zygo/LAMBDA_nexview_SB0346A_031814.pdf (6 pages).

(Continued)

*Primary Examiner* — Gary C Vieaux
(74) *Attorney, Agent, or Firm* — Seed Intellectual Property Law Group LLP

(57) ABSTRACT

A machine vision inspection system includes a movement portion comprising one or more movement mechanisms configured to adjust a relative position between an optical assembly portion and a workpiece. The optical assembly portion includes a camera that receives imaging light transmitted along an imaging optical path and provides images of a surface of the workpiece, and an objective lens that inputs the imaging light arising from the surface of the workpiece and transmits the imaging light along the imaging optical path to the camera. The optical assembly portion further includes a lens motion mechanism comprising a motion portion configured to enable motion of the objective lens from a rest position when a corresponding force is applied by a contact with the workpiece or other object (e.g., as corresponding to a collision with the workpiece or other object, and for which the system may stop motion when such a contact occurs).

25 Claims, 12 Drawing Sheets

(56) References Cited

U.S. PATENT DOCUMENTS

| | | | |
|---|---|---|---|
| 4,270,275 A | | 6/1981 | McMurtry |
| 5,253,428 A | | 10/1993 | McMurtry |
| 5,345,690 A | | 9/1994 | McMurtry et al. |
| 5,353,514 A | | 10/1994 | McMurtry |
| 5,491,904 A | | 2/1996 | McMurtry |
| 5,583,690 A | * | 12/1996 | Andrae ................. G01N 21/21 359/368 |
| 5,592,101 A | * | 1/1997 | Takahashi .............. G01R 1/071 324/750.25 |
| 5,669,151 A | | 9/1997 | Collingwood |
| 5,671,542 A | | 9/1997 | Zannis et al. |
| 5,755,038 A | | 5/1998 | McMurtry |
| 5,939,709 A | * | 8/1999 | Ghislain ................ G02B 21/02 250/234 |
| 6,472,981 B2 | | 10/2002 | Fuge et al. |
| 6,542,180 B1 | | 4/2003 | Wasserman et al. |
| 6,776,344 B2 | | 8/2004 | Daniel et al. |
| 6,839,563 B1 | | 1/2005 | Kirby et al. |
| 6,860,026 B2 | | 3/2005 | Fuge |
| 6,941,671 B2 | | 9/2005 | Fuge |
| 7,030,351 B2 | | 4/2006 | Wasserman et al. |
| 7,130,117 B2 | * | 10/2006 | Tsuyuki ................... G02B 7/08 359/383 |
| 7,145,468 B2 | | 12/2006 | Collingwood et al. |
| 7,285,935 B2 | | 10/2007 | Fuge |
| 7,316,077 B2 | | 1/2008 | Fuge et al. |
| 7,324,682 B2 | | 1/2008 | Wasserman |
| 7,441,707 B2 | | 10/2008 | Daniel et al. |
| 7,454,053 B2 | | 11/2008 | Bryll et al. |
| 7,466,852 B2 | | 12/2008 | Cotton et al. |
| 7,486,195 B2 | | 2/2009 | Collingwood et al. |
| 7,570,795 B2 | | 8/2009 | Yu et al. |
| 7,603,789 B2 | | 10/2009 | Hellier et al. |
| 7,627,162 B2 | | 12/2009 | Blanford et al. |
| 7,665,219 B2 | | 2/2010 | Styles et al. |
| 7,689,379 B2 | | 3/2010 | Fuge et al. |
| 7,792,654 B2 | | 9/2010 | Prestidge et al. |
| 7,812,736 B2 | | 10/2010 | Collingwood et al. |
| 7,821,420 B2 | | 10/2010 | Woollett et al. |
| 8,111,905 B2 | | 2/2012 | Campbell |
| 8,111,938 B2 | | 2/2012 | Bryll et al. |
| 8,140,287 B2 | | 3/2012 | Prestidge et al. |
| 8,534,113 B2 | | 9/2013 | Bryll et al. |
| 9,080,855 B2 | | 7/2015 | Nahum et al. |
| 9,140,547 B2 | | 9/2015 | Woollett et al. |
| 9,143,674 B2 | | 9/2015 | Gladnick |
| 9,830,694 B2 | | 11/2017 | Bryll |
| 10,145,666 B2 | | 12/2018 | Jansson |
| 10,178,321 B2 | | 1/2019 | Emtman et al. |
| 10,184,773 B2 | | 1/2019 | Jansson |
| 10,185,224 B2 | * | 1/2019 | Zijp ..................... G03F 7/70641 |
| 10,415,949 B2 | | 9/2019 | Koga et al. |
| 10,852,119 B2 | | 12/2020 | Harsila et al. |
| 11,047,678 B2 | | 6/2021 | Koga et al. |
| 11,268,874 B2 | | 3/2022 | Saito et al. |
| 11,328,409 B2 | | 5/2022 | Emtman |
| 2003/0193345 A1 | * | 10/2003 | Hanson ................. G01R 31/311 356/237.5 |
| 2005/0030051 A1 | * | 2/2005 | Hanson .................. G02B 21/24 356/237.1 |
| 2009/0130987 A1 | | 5/2009 | Daniel et al. |
| 2011/0002361 A1 | | 1/2011 | Woollett et al. |
| 2020/0166336 A1 | * | 5/2020 | Koga .................... G01B 21/047 |

FOREIGN PATENT DOCUMENTS

| | | |
|---|---|---|
| EP | 3748282 A1 | 12/2020 |
| WO | WO 2004057552 A1 | 7/2004 |
| WO | WO 2007028964 A1 | 3/2007 |

OTHER PUBLICATIONS

Mitutoyo America Corporation, "CNC Vision Measuring System," in Vision Measuring Systems, Quick Vision Series, Bulletin 2118(2), United States, Aug. 2018, 40 pages.

Mitutoyo America Corporation, "CNC Vision Measuring System," in Vision Measuring Systems, Quick Vision and Quick Vision Pro Series, Bulletin 2316, United States, Jan. 2022, 32 pages.

Mitutoyo Corporation & Micro Encoder Inc., "QVPAK—3D CNC Vision Measuring Machine—User's Guide," Manual No. 99MCB225A, Version 7, Series No. 359, Jan. 2003. (326 pages).

Nikon, "MicroscopyU: Properties of Microscope Objectives," URL= https://www.microscopyu.com/microscopy-basics/properties-of-microscope-objectives, retrieved on May 15, 2023. (12 pages).

Schlesselman, "Towards a Low-Cost Machine Vision Solution for Collision Detection on 3-Axis CNC Machines," Thesis, California State University—Sacramento, Sacramento, California, Fall 2019 (38 pages).

Zeiss, "Carl Zeiss Microscopy Online Campus: Microscope Objectives," URL=https://zeiss-campus.magnet.fsu.edu/articles/basics/objectives.html, retrieved on May 15, 2023. (13 pages).

Renishaw, "Innovations in touch-trigger probe sensor technology," White paper, Issue 1 2003. (8 pages).

Renishaw, "One-touch versus two-touch probing strategies," White paper TE412, 2010. (4 pages).

Renishaw, "Probing systems for CNC machine tools," Technical Paper, 2001. (204 pages).

Slocum, "Kinematic Couplings: A Review of Design Principles and Applications," International Journal of Machine Tools and Manufacture, Massachusetts Institute of Technology, 2010. (35 pages).

\* cited by examiner

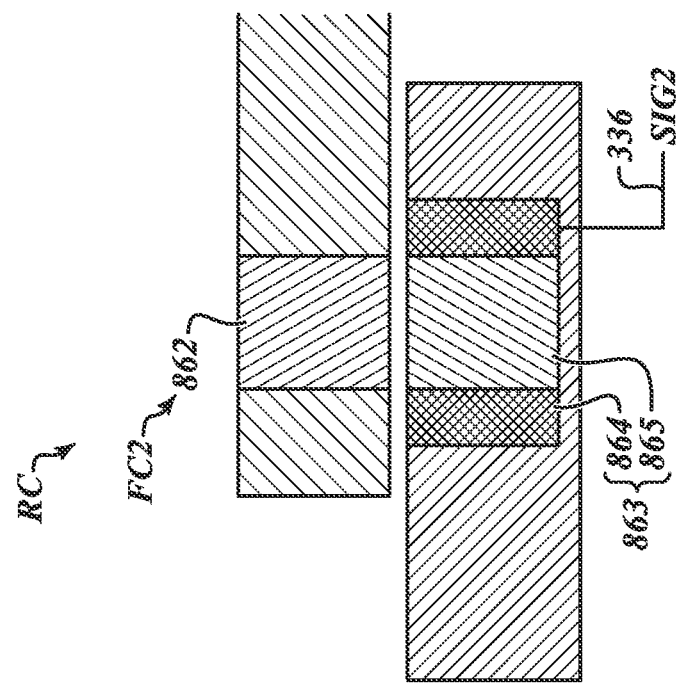
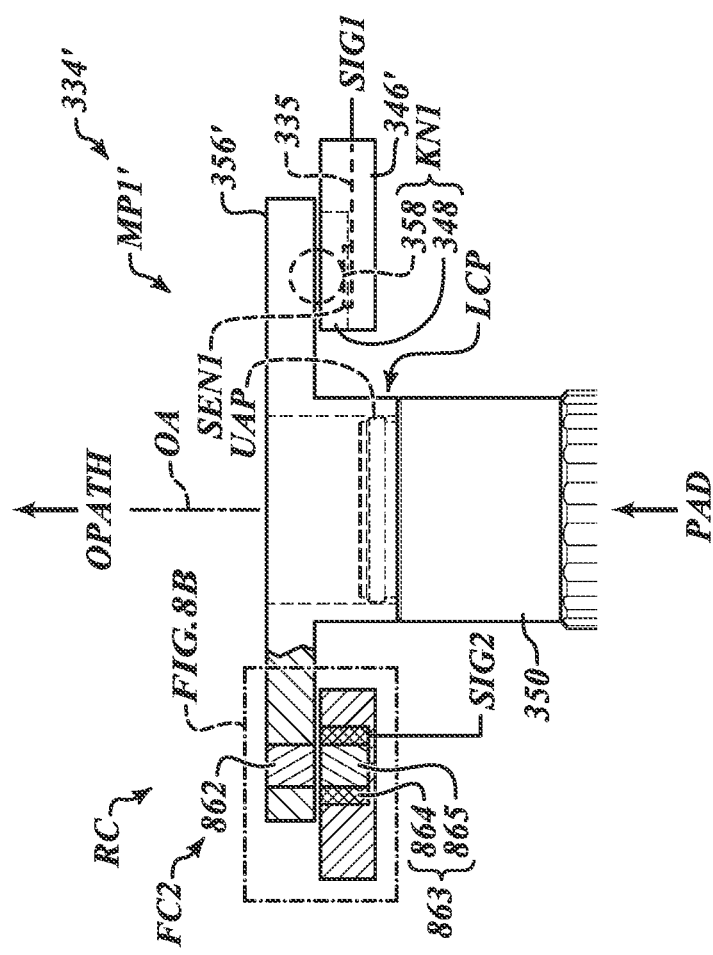
FIG. 8B
FIG. 8A

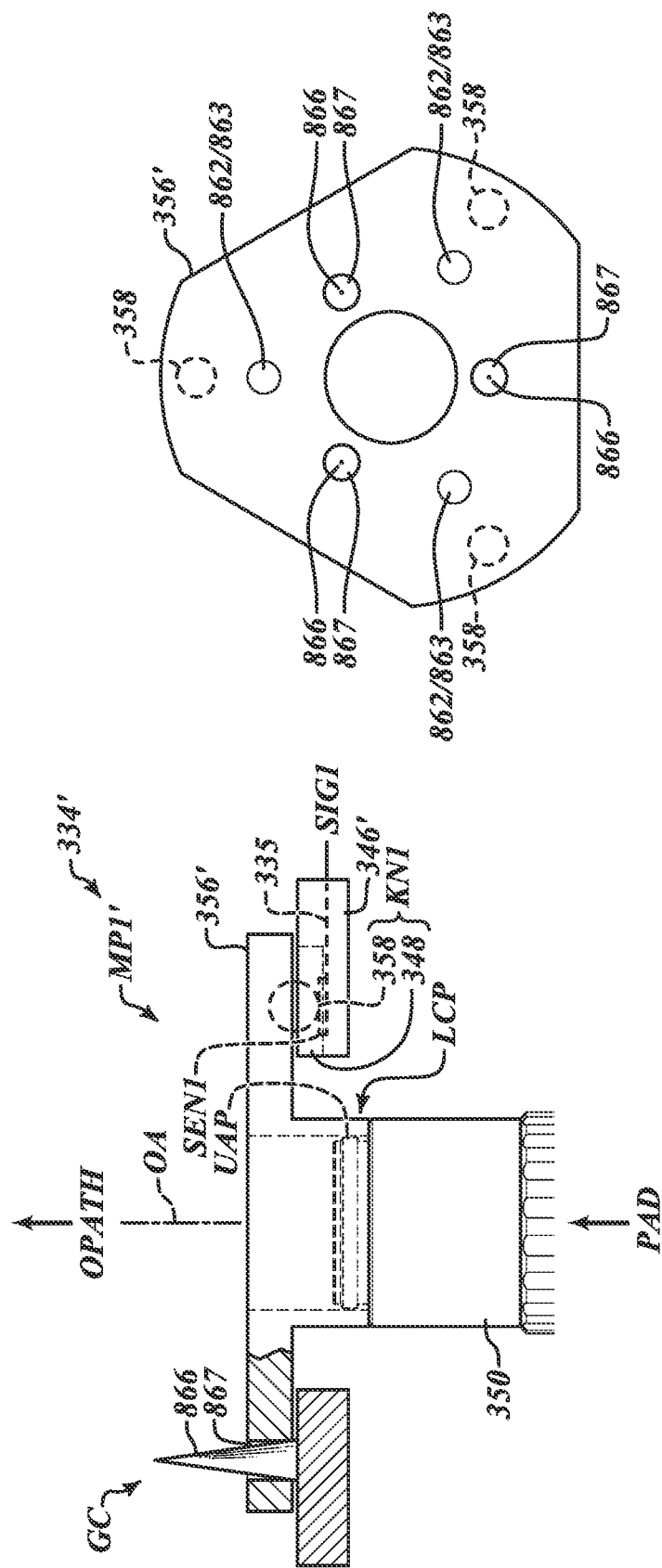

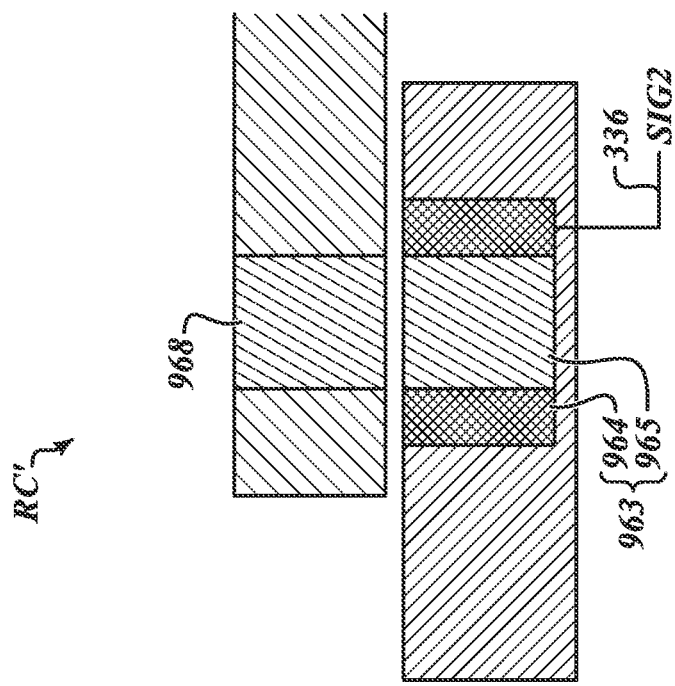
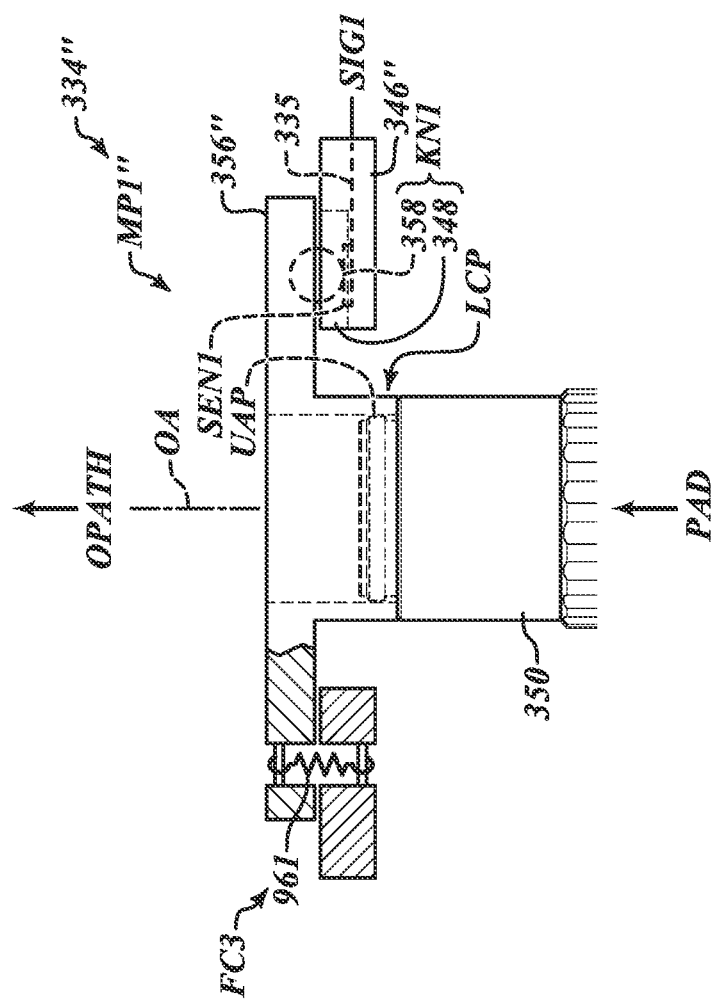
FIG. 9B
FIG. 9A

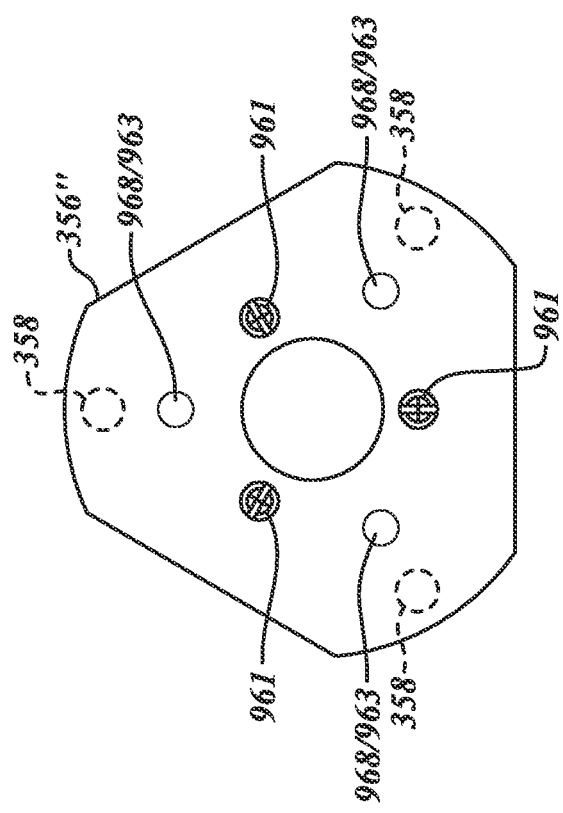

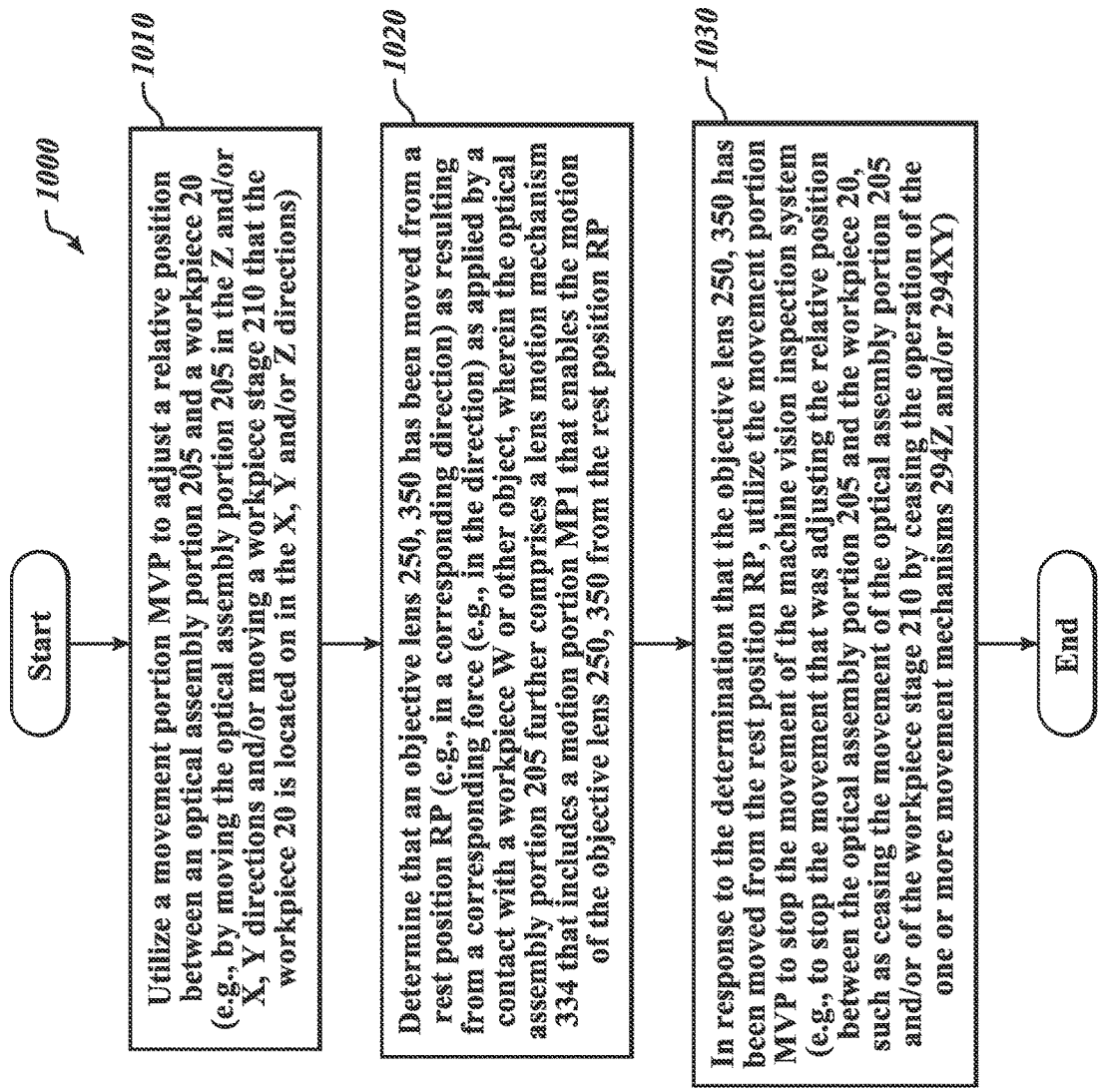

MACHINE VISION SYSTEM WITH OBJECTIVE LENS AND COLLISION PROTECTION

BACKGROUND

Technical Field

This disclosure relates to precision metrology and, more particularly, to a machine vision system with an objective lens.

Description of the Related Art

Precision non-contact metrology systems such as precision machine vision inspection systems (or "vision systems" for short) may be utilized to obtain precise dimensional measurements of objects and to inspect various other object characteristics, and may include a computer, a camera, an optical system with an objective lens, and a precision stage that moves to allow workpiece traversal and inspection. One exemplary prior art system is the QUICK VISION® series of PC-based vision systems and QVPAK® software available from Mitutoyo America Corporation (MAC), located in Aurora, Illinois. The features and operation of the QUICK VISION® series of vision systems and the QVPAK® software are generally described, for example, in the QVPAK 3D CNC Vision Measuring Machine User's Guide, published January 2003, which is hereby incorporated by reference in its entirety. This type of system uses a microscope-type optical system including an objective lens and moves the stage and/or optical system to provide inspection images of workpieces.

Quality control of workpieces that include specific surface profiles, such as those produced by molding and/or machining, is becoming increasingly demanding in terms or throughput, measurement resolution, and accuracy. Correspondingly, in some applications it may be desirable to perform the relative movements for providing inspection images of workpieces relatively quickly and accurately, and for which safety is a factor (e.g., in regard to possible collisions, etc.). Systems and configurations that may improve or otherwise enhance such machine vision inspection systems (e.g., in relation to improved capabilities and/or characteristics, such as in relation to the safety of the configurations for capturing the inspection images, etc.) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect, a machine vision inspection system includes a movement portion comprising one or more movement mechanisms configured to adjust a relative position between an optical assembly portion and a workpiece. The optical assembly portion includes a camera that receives imaging light transmitted along an imaging optical path and provides images of a surface of the workpiece; and an objective lens that inputs the imaging light arising from the surface of the workpiece, and transmits the imaging light along the imaging optical path to the camera. The optical assembly portion further includes a lens motion mechanism comprising a motion portion configured to enable motion of the objective lens from a rest position when a corresponding force is applied by a contact with the workpiece or other object. In various implementations, such a contact may correspond to a collision with the workpiece or other object, and the system may be configured to stop motion when such a contact occurs.

According to another aspect, a method is provided for operating the machine vision inspection system. The method includes generally three steps. The first step includes utilizing the movement portion to adjust a relative position between the optical assembly portion and the workpiece. The second step includes determining that the objective lens has been moved from a rest position as resulting from a corresponding force as applied by a contact with a workpiece or other object, wherein the optical assembly portion comprises the lens motion mechanism that includes a motion portion that enables the motion of the objective lens from the rest position. The third step includes, in response to the determination that the objective lens has been moved from the rest position, utilizing the movement portion to stop the movement of the machine vision inspection system. The method may further include a fourth step of, after the stopping of the movement of the machine vision inspection system, utilizing the movement portion to move the optical assembly portion including the objective lens away from the workpiece or other object with which the contact was made, wherein after the movement away, the motion portion enables movement of the objective lens back to the rest position.

According to a further aspect, the lens motion mechanism is provided for utilization in a machine vision inspection system. The lens motion mechanism comprises the motion portion configured to enable motion of the objective lens from a rest position when a corresponding force is applied by a contact with a workpiece or other object.

The machine vision inspection system, the method, and the lens motion mechanism of the present disclosure provide effective means for minimizing potential damage from a collision between the objective lens and the workpiece or other object.

BRIEF DESCRIPTION OF THE DRAWINGS

FIGS. 8A-8D are diagrams of a second implementation of a lens motion mechanism.

FIGS. 9A-9C are diagrams of a third implementation of a lens motion mechanism.

FIG. 10 is a flow diagram illustrating one embodiment of a general routine for operating a machine vision inspection system including a lens motion mechanism.

DETAILED DESCRIPTION

Figure 1:
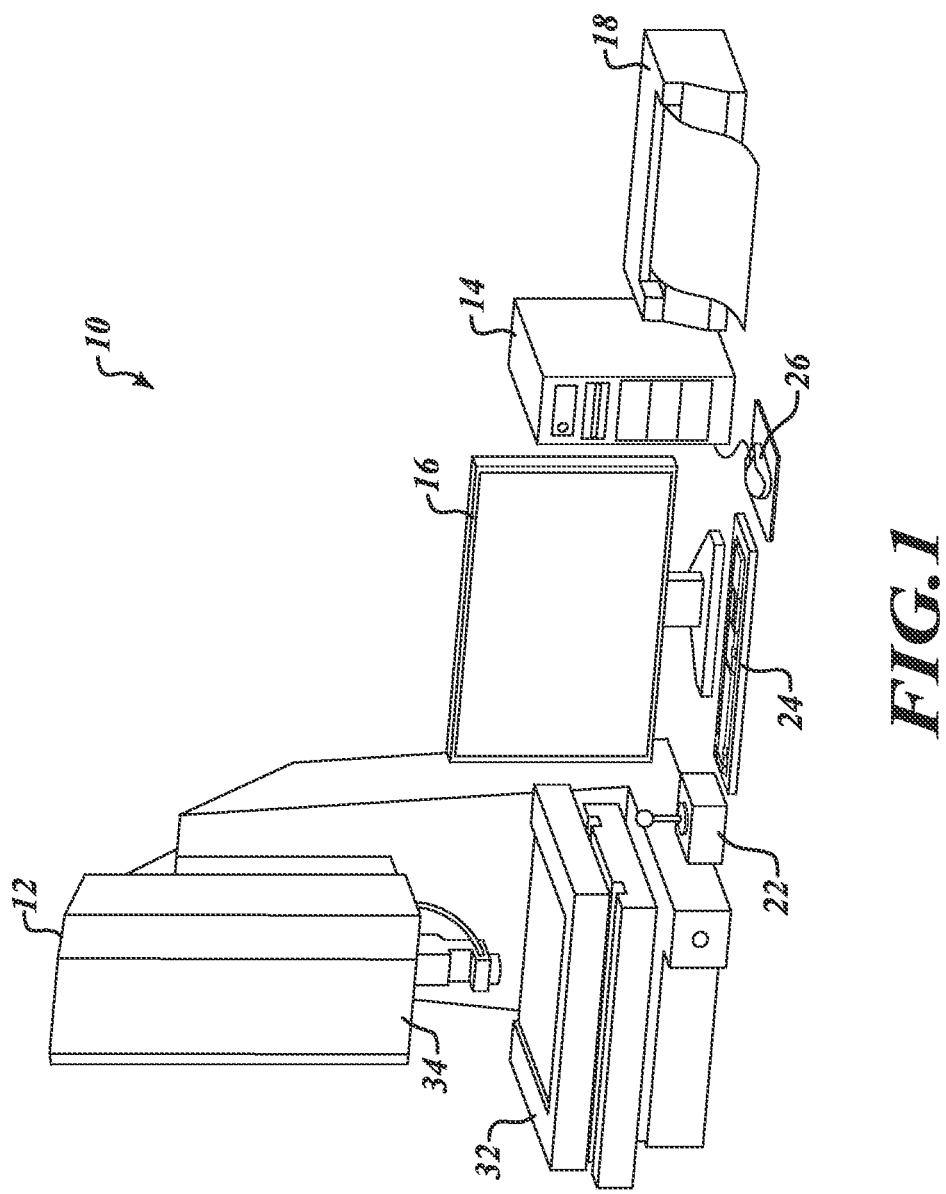
FIG. 1 is a diagram showing various typical components of a general purpose machine vision inspection system.

FIG. 1 is a block diagram of an exemplary machine vision inspection system 10. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that in various implementations, a touchscreen tablet or other computing elements or the like may be substituted for and/or redundantly provided to perform the functions of any or all of the elements 14, 16, 22, 24 and 26.

Those skilled in the art will appreciate that the controlling computer system 14 and/or control system portion 120 (FIG. 2) may generally be implemented using any suitable computing system or device, including distributed or networked computing environments, and the like. Such computing systems or devices may include one or more general-purpose or special-purpose processors (e.g., non-custom or custom devices) that execute software to perform the functions described herein. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable objective lenses. In various implementations, the optical imaging system 34 may be movable (e.g., in x-axis, y-axis and/or z-axis directions) in relation to the workpiece stage 32, and/or the workpiece stage 32 may be movable (e.g., in x-axis, y-axis and/or z-axis directions) to move a workpiece, etc. that is located on the workpiece stage relative to the optical imaging system 34. The zoom lens or interchangeable objective lenses generally provide various magnifications for the images provided by the optical imaging system 34. Certain aspects of the machine vision inspection system 10 are also described in U.S. Pat. Nos. 7,454,053; 7,324,682; 8,111,905; and 8,111,938, each of which is hereby incorporated herein by reference in its entirety.

Figure 2:
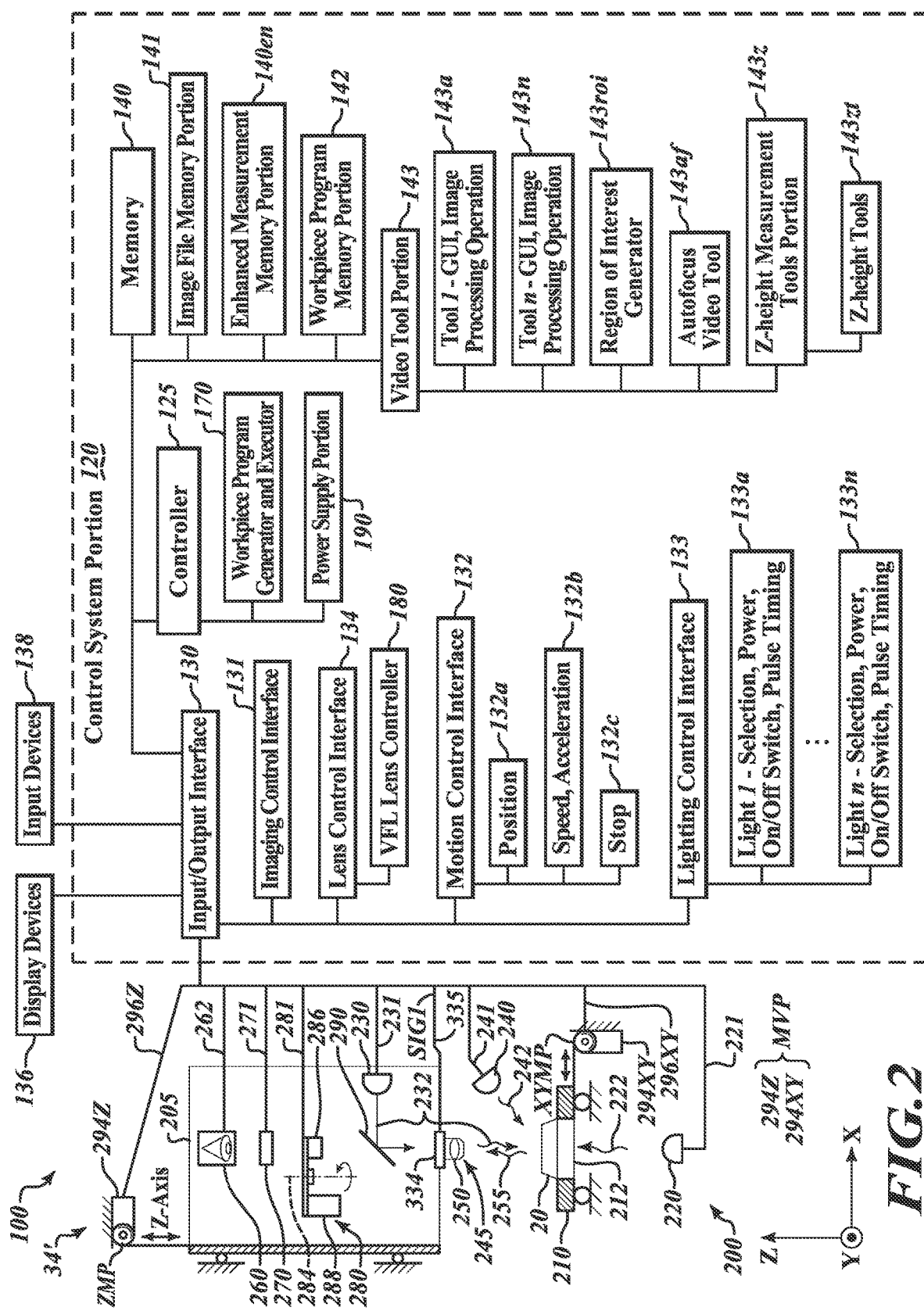
FIG. 2 is a block diagram of a control system portion and a vision components portion of a machine vision inspection system similar to that of FIG. 1, and including features according to this invention such as a lens motion mechanism.

FIG. 2 is a block diagram of a control system portion 120 and a vision components portion 200 of a machine vision inspection system 100 similar to the machine vision inspection system of FIG. 1, including certain features disclosed herein. As will be described in more detail below, the control system portion 120 is utilized to control the vision components portion 200. The control system portion 120 may be arranged to exchange data and control signals with the vision components portion 200. The vision components portion 200 includes an optical imaging system 34' and a workpiece stage 210 (e.g., which may be similar or identical to the stage 32 of FIG. 1). In some implementations, at least part of the workpiece stage 210 may be implemented as a conveyor that one or more workpieces 20 are located on and moved to pass under the optical imaging system 34' for imaging, for example. The optical imaging system 34' includes an optical assembly portion 205 and light sources 220, 230, 240.

In the example of FIG. 2, the workpiece stage 210 includes a central transparent portion 212 and is controllably movable along x- and y-axes that lie in a plane that is generally parallel to the surface of the stage where a workpiece 20 and other objects may be positioned. In one implementation, the workpiece stage 210 may be controllably movable along the x- and/or y-axes by a movement mechanism 294XY configured to change a stage position of the workpiece stage 210 relative to at least part of the imaging system 34'. In various implementations, the movement mechanism 294XY (e.g., a controllable motor) may drive an actuator to move the workpiece stage 210 (e.g., to move the workpiece 20) relative to the optical assembly portion 205 including the objective lens 250 of the imaging system 34'. When the workpiece stage 210 is moved, a field of view (FOV) of the optical assembly portion 205 of the imaging system is moved to different parts of the workpiece 20, etc., for acquiring different images at different image positions, such as for acquiring images of different features of the workpiece 20. In various implementations, the workpiece stage 210 may also or alternatively be controllably movable along the z-axis by using the movement mechanism 294XY.

An encoder-based measurement portion XYMP (e.g., as included in or attached to the movement mechanism 294XY or otherwise coupled to or proximate to the workpiece stage 210) includes one or more position encoders, and provides position measurements indicative of the position of the workpiece stage 210 (e.g., relative to the optical assembly portion 205). Specifically, the encoder-based measurement portion XYMP may provide position measurements indicative of the stage position relative to at least part of the imaging portion 34'. The movement mechanism 294XY (e.g., a controllable motor) and the encoder-based measurement portion XYMP are connected to an input/output interface 130 via a signal line 296XY (e.g., which may include separate signal line portions for providing control signals to and/or for receiving signals from the movement mechanism 294XY and the encoder-based measurement portion XYMP).

The optical assembly portion 205 includes a camera system 260 and an interchangeable objective lens 250 included in an objective lens portion 245. In some implementations, the optical assembly portion 205 may optionally include a variable focal length (VFL) lens 270, e.g., a tunable acoustic gradient (TAG) lens that creates a lensing effect using sound waves in a fluid medium, such as that disclosed in U.S. Pat. Nos. 9,143,674 and 9,830,694, each of which is hereby incorporated herein by reference in its entirety.

In various implementations, the optical assembly portion 205 may further include a turret lens assembly 280 having lenses 286 and 288. As an alternative to the turret lens assembly, in various implementations a fixed or manually interchangeable magnification-altering lens, or a zoom lens configuration, or the like, may be included. In various implementations, the interchangeable objective lens 250 in the objective lens portion 245 may be selected from a set of fixed magnification objective lenses that are included as part of a variable magnification lens portion (e.g., a set of objective lenses corresponding to magnifications such as 0.5×, 1×, 2× or 2.5×, 5×, 10×, 20× or 25×, 50×, 100×, etc.).

In various implementations, the optical assembly portion 205 is controllably movable along a z-axis that is generally orthogonal to the x- and y-axes by using a movement mechanism 294Z (e.g., a controllable motor) that drives an actuator to move the optical assembly portion 205 along the z-axis to change the focus of the image of the workpiece 20. In various implementations, the optical assembly portion 205 may also or alternatively be controllably movable along the x- and/or y-axes by using the movement mechanism 294Z. An encoder-based measurement portion ZMP (e.g., as included in or attached to the movement mechanism 294Z or otherwise coupled to or proximate to the optical assembly portion 205) includes one or more position encoders, and provides position measurements indicative of the position of the optical assembly portion 205 (e.g., relative to the stage 210 on which the workpiece 20 is located). The movement mechanism 294Z and the encoder based measurement portion ZMP are connected to an input/output interface 130 via a signal line 296Z (e.g., which may include separate signal line portions for providing control signals to and/or for receiving signals from the movement mechanism 294Z and the encoder-based measurement portion ZMP). For example, the control signals may be provided through the input/output interface 130 to control the movement mechanism 294Z to move the optical assembly portion 205 to change the focus of the image (e.g., to change the focus position of the objective lens 250 relative to the workpiece 20).

In various implementations, to change the focus of the image over a smaller range, or as an alternative to moving the optical assembly portion 205, the VFL (TAG) lens 270 may be controlled via a signal line 271 by a lens control interface 134 to periodically modulate the optical power of the VFL lens 270 and thus modulate an effective focus position of the optical assembly portion 205. The lens control interface 134 may include or be connected to a VFL lens controller 180 including circuits and/or routines for controlling various image exposures synchronized with the periodic focus position modulation provided by the VFL (TAG) lens 270. In some implementations, the lens control interface 134 and the VFL lens controller 180 may be merged and/or indistinguishable.

One or more of a stage light source 220, a coaxial light source 230, and a surface light source 240 (e.g., a ring light) may emit source light 222, 232, and/or 242, respectively, to illuminate the workpiece or workpieces 20. For example, during an image exposure, the coaxial light source 230 may emit source light 232 along a path including a beam splitter 290 (e.g., a partial mirror). The source light 232 is reflected or transmitted from the workpiece 20 as image light 255, and the image light used for imaging passes through the interchangeable objective lens 250, the turret lens assembly 280, and the VFL (TAG) lens 270, and is received by (e.g., gathered by) the camera system 260. A workpiece image exposure, which includes the image of the workpiece(s) 20, is captured by the camera system 260 (e.g., including a pixel array), and is output on a signal line 262 to the control system portion 120. In addition to carrying image data, the signal line 262 may carry signals from the controller 125 for controlling the camera system 260 (e.g., for initiating image acquisition, etc.)

Various light sources (e.g., the light sources 220, 230, 240) may be connected to a lighting control interface 133 of the control system portion 120 through associated signal lines (e.g., the busses 221, 231, 241, respectively). The control system portion 120 may control the turret lens assembly 280 to rotate along axis 284 to select a turret lens (e.g., having a magnification of 1×, 2×, 4×, or 6×, etc.) through a signal line or bus 281 to alter an image magnification.

As shown in FIG. 2, in various exemplary implementations, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various portions/elements. The input/output interface 130 includes an imaging control interface 131, a motion control interface 132, a lighting control interface 133, and the lens control interface 134. The motion control interface 132 may include a position control portion 132a, a speed/acceleration control portion 132b and a stop portion 132c, although such portions may be merged and/or indistinguishable. The lighting control interface 133 may include lighting control portions 133a-133n, that control, for example, the selection, power, and on/off switch for the various corresponding light sources of the machine vision inspection system 100.

The memory 140 may include an image file memory portion 141, a workpiece program memory portion 142 that may include one or more part programs, or the like, and a video tool portion 143. Machine vision inspection systems generally utilize automated video inspection. U.S. Pat. No. 6,542,180 (the '180 patent) teaches various aspects of such automated video inspection and is incorporated herein by reference in its entirety. As taught in the '180 patent, automated video inspection metrology instruments generally have a programming capability that allows an automatic inspection event sequence to be defined by the user for each particular workpiece configuration. This can be implemented by text-based programming, for example, or through a recording mode which progressively "learns" the inspection event sequence by storing a sequence of machine control instructions corresponding to a sequence of inspection operations performed by a user with the aid of a graphical user interface, or through a combination of both methods. Such a recording mode is often referred to as "learn mode" or "training mode." Once the inspection event sequence is defined in "learn mode," such a sequence can then be used to automatically acquire (and additionally analyze or inspect) images of a workpiece during "run mode."

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as edge/boundary detection video tools.

Video tools (or "tools" for short) and other graphical user interface features may be used manually to accomplish manual inspection and/or machine control operations (in "manual mode"). Their set-up parameters and operation can also be recorded during learn mode, in order to create automatic inspection programs, or "part programs". Video tools may include, for example, edge/boundary detection tools, autofocus tools, shape or pattern matching tools, dimension measuring tools, and the like.

The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. Examples of the operations of such video tools for locating edge features and performing other workpiece feature inspection operations are described in more detail in certain of the previously incorporated references, as well as in U.S. Pat. No. 7,627,162, which is hereby incorporated herein by reference in its entirety.

The video tool portion 143 also includes an autofocus video tool 143af that determines the GUI, image-processing operation, etc., for focus height measurement operations. In various implementations, the autofocus video tool 143af may additionally include a high-speed focus height tool that may be utilized to measure focus heights with high speed, as described in more detail in U.S. Pat. No. 9,143,674, which is hereby incorporated herein by reference in its entirety. In various implementations, the high-speed focus height tool may be a special mode of the autofocus video tool 143af that may otherwise operate according to conventional methods for autofocus video tools, or the operations of the autofocus video tool 143af may only include those of the high-speed focus height tool. High-speed autofocus and/or focus position determination for an image region or regions of interest may be based on analyzing the image to determine a corresponding quantitative contrast metric for various regions, according to known methods. For example, such methods are disclosed in U.S. Pat. Nos. 8,111,905; 7,570,795; and 7,030,351, each of which is hereby incorporated herein by reference in its entirety.

In the context of this disclosure, and as is known by one of ordinary skill in the art, the term "video tool" generally refers to a relatively complex set of automatic or programmed operations that a machine vision user can implement through a relatively simple user interface. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. It should be noted that the visible user interface features are sometimes referred to as the video tool, with the underlying operations being included implicitly.

In general, the memory portion 140 stores data usable to operate the vision system components portion 200 to capture or acquire an image of the workpiece 20 such that the acquired image of the workpiece 20 has desired image characteristics. The memory portion 140 may also contain data defining a graphical user interface operable through the input/output interface 130. The memory portion 140 may also store inspection result data, may further store data usable to operate the machine vision inspection system 100 to perform various inspection and measurement operations on the acquired images (e.g. implemented, in part, as video tools), either manually or automatically, and to output the results through the input/output interface 130.

One or more display devices 136 (e.g., the display 16 of FIG. 1) and one or more input devices 138 (e.g., the joystick 22, keyboard 24, and mouse 26 of FIG. 1) may be connected to the input/output interface 130. The display devices 136 and input devices 138 may be used to display a user interface that may include various graphical user interface (GUI) features that are usable to perform inspection operations, and/or to create and/or modify part programs, to view the images captured by the camera system 260, and/or to directly control the vision components portion 200. The display devices 136 may display user interface features associated with the enhanced measurement user interface 143enui.

In various exemplary implementations, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a run mode workpiece, or workpieces, which matches the representative workpiece used when creating the part program.

These analysis and inspection methods that are used to inspect features in a workpiece image are typically embodied in the various video tools (e.g. video tools 143a, 143n, etc.) included in the video tool portion 143 of the memory 140, as outlined above. Many known video tools, or "tools" for short, are included in commercially available machine vision inspection systems, such as the QUICK VISION® series of vision systems and the associated QVPAK® software, discussed above.

The video tool portion 143 also includes Z-height measurement tools portion 143z, which provides various operations and features related to Z-height measurement operations. In one implementation, the Z-height measurement tools portion 143z may include Z-height tools 143zt (e.g., including an autofocus tool, a multipoint autofocus tool, etc.). The Z-height tools 143zt may govern certain aspects of image stack acquisition and related pattern projection operations and processing in conjunction with the Z-height tools that are configured in a mode that determines best focus heights and/or Z-height measurements (e.g., as part of points from focus type operations, etc.). Briefly, the Z-height measurement tools portion 143z may perform at least some operations similarly to known Z-height measurement tools which perform, for example, operations in learn mode and run mode for generating all or parts of focus curves, and finding peaks as best focus positions, etc.

As will be described in more detail below with respect to FIGS. 3-10, the machine vision inspection system 10, 100 according to exemplary embodiments includes a lens motion mechanism 334 (FIG. 2) configured to enable a motion of the objective lens 250, 350 from a rest position RP (FIG. 3) when a corresponding force is applied by a contact with the workpiece 20 or other object (e.g., as resulting from a movement by the movement mechanism 294Z or/or 294XY which causes the contact with the workpiece 20 or other object). The lens motion mechanism 334 is thus useful to prevent collision between the objective lens 250, 350 (or any element associated with the objective lens 250, 350) and the workpiece 20 or other object, to thereby improve safety of the machine vision inspection system 10, 100. In various implementations, the objective lens 250, 350 may include one or more lenses as well as a casing for holding the one or more lenses, a protective cover, etc., which may make contact with the workpiece 20 or other object. In other words, in some instances it may not be a lens itself that makes contact, since it could be a protective cover or other element of the objective lens 250 that actually makes the contact with the workpiece 20 or other object. As described herein, without the utilization of the lens motion mechanism 334, such contact may otherwise be more likely to cause damage to the objective lens 250, 350 (e.g., as may be relatively expensive), and/or other portions of the optical assembly portion 205 to which the objective lens 250, 350 is coupled, or may cause damage to the workpiece 20, the workpiece stage 210 and/or any other object with which contact is made. Still further, such collisions may have damaging effects on the structure, alignment and/or calibration of the machine vision inspection system 10, 100. Note that in certain prior systems, an objective lens 250, 350 has typically been fixedly attached within an optics portion with no compliance for moving from a rest position RP when a contact (e.g., a precursor to a collision) occurred.

The machine vision inspection system 10, 100 according to exemplary embodiments includes a movement portion MVP (FIG. 2) including one or more movement mechanisms (e.g., movement mechanisms 294Z and 294XY) configured to adjust a relative position between the optical assembly portion 205 and the workpiece 20 (e.g., by moving the optical assembly portion 205 in the Z and/or X directions and/or moving the workpiece stage 210 that the workpiece 20 is located on in the Y and/or X directions). The optical assembly portion 205 includes the camera system 260 that receives the imaging light 255 transmitted along an imaging optical path OPATH (FIG. 3) and provides images of a surface of the workpiece 20; and the objective lens 250, 350 (FIG. 3) that inputs the imaging light arising from the surface of the workpiece 20 which is illuminated by a light source (e.g., light source 220, 230, 240) and transmits the imaging light along the imaging optical path OPATH to the camera system 260. As described herein, the lens motion mechanism 334 may be configured such that the objective lens 250, 350 is configured to be in a rest position RP (e.g., relative to a motion mechanism holding portion 346, or other reference portion of the lens motion mechanism 334 and/or optical assembly portion 205, such as the camera system 260, etc.) when a sufficient corresponding force is not applied by a contact with the workpiece 20 or other object (e.g., the stage 210, etc.) to move the objective lens 250, 350 from the rest position RP.

Figure 3:
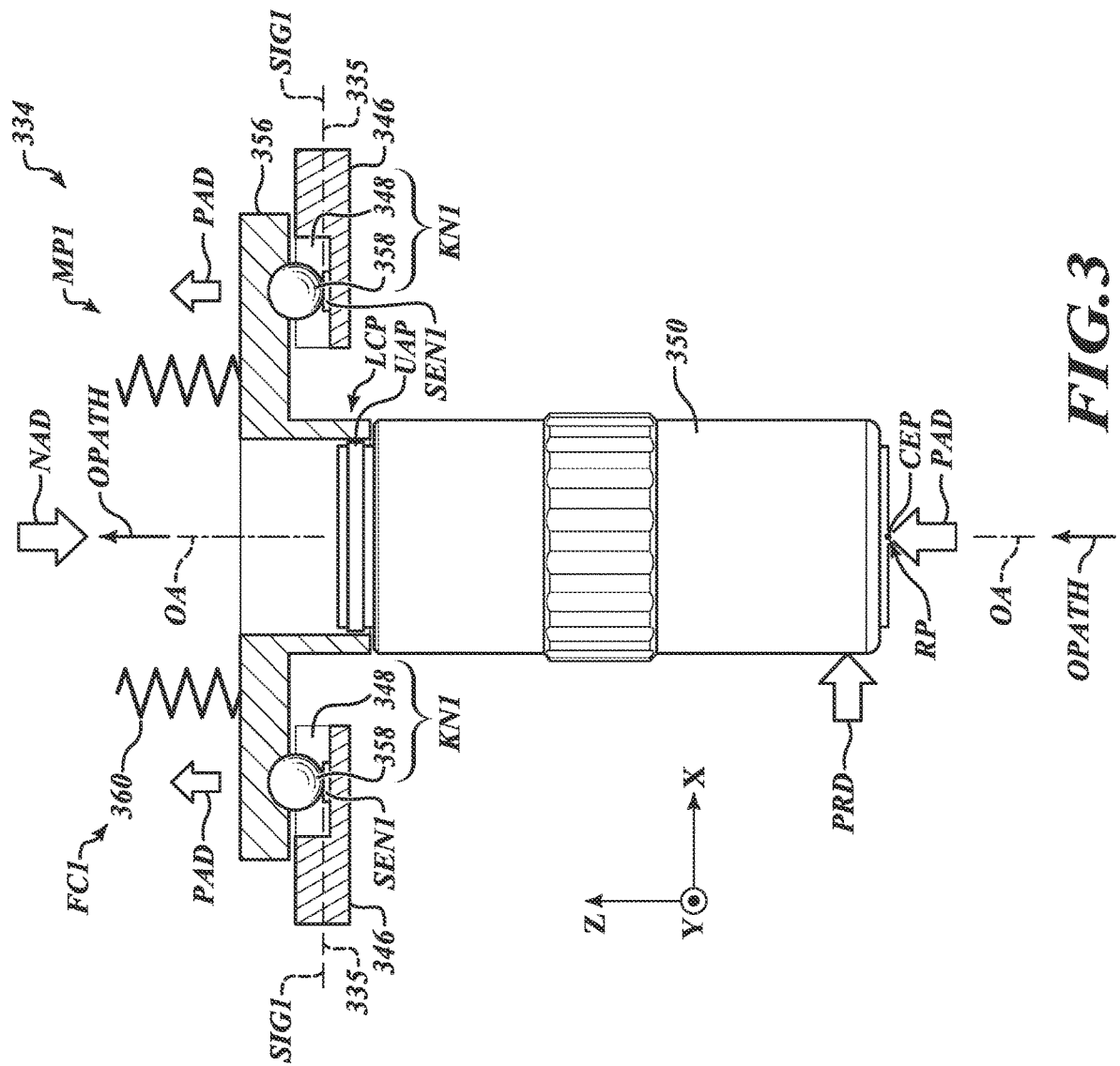
FIG. 3 is a diagram of a partially cross-sectional front view of a portion of an implementation of the lens motion mechanism of FIG. 2.
Figure 4:
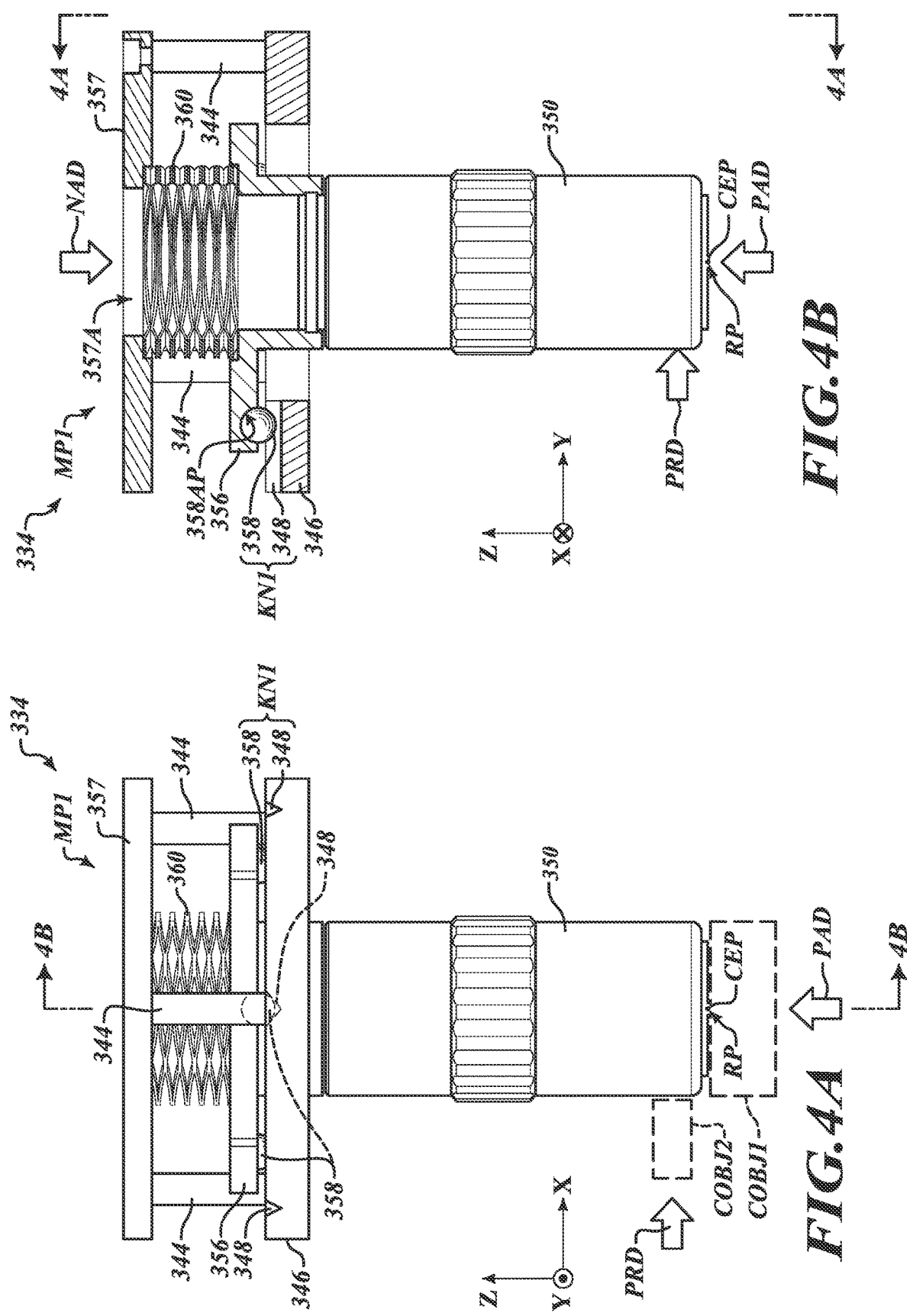
FIGS. 4A and 4B are diagrams of a front view and a partially cross-sectional side view, respectively, of an implementation of the lens motion mechanism of FIG. 2.

FIG. 3 is a diagram of a partially cross-sectional front view of a portion of an implementation of the lens motion mechanism 334 of FIG. 2, and FIGS. 4A and 4B are diagrams of a front view and a partially cross-sectional side view, respectively, of an implementation of the lens motion mechanism 334 (e.g., with the objective lens 350 being similar or identical to the objective lens 250, etc.). As illustrated in FIGS. 3, 4A and 4B, the lens motion mechanism 334 includes a motion portion MP1 configured to enable motion of the objective lens 350 from a rest position RP in a positive axial direction PAD (e.g., a movement in relation to the motion mechanism holding portion 346 and toward the camera system 260) when a corresponding force in the positive axial direction PAD is applied by a contact with an object COBJ1 (e.g., as illustrated in FIG. 4A, in which the object COBJ1 may be the workpiece 20, the stage 210, or other object). The motion portion MP1 is also configured to enable motion of the objective lens 350 from the rest position RP in a perpendicular direction PRD (e.g., which is perpendicular to the positive axial direction PAD) when a corresponding force in the perpendicular direction PRD is applied by a contact with an object COBJ2 (e.g., as illustrated in FIG. 4A, in which the object COBJ2 may be the workpiece 20, or other object, etc.).

In various implementations, any reference point (e.g., at a central end portion CEP at a distal end of the objective lens 350, etc.) on the objective lens 350 may be utilized for indicating when the objective lens is in, or moved from, the rest position (e.g., the current coordinates of the reference point may be either at, or different than, the coordinates of the corresponding reference position). Similarly, any reference point on any other component of the lens motion mechanism 334 may be utilized for indicating when that component is in, or moved from, a rest position of that component (e.g., the current coordinates of the reference point may be either at, or different than, the coordinates of the corresponding reference position). In various implementations, coordinates of the a rest position (e.g., rest position RP) may be in a coordinate system that may be in relation to part of the motion mechanism holding portion 346, or other reference portion of the lens motion mechanism 334 and/or optical assembly portion 205 (e.g., including the camera 260), etc. In the example of FIG. 3, the rest position RP is indicated as being along a central axis and at a certain distance from the motion mechanism holding portion 346 (and/or from the camera 360, etc.) In this example, when the reference point (e.g., at a central end portion CEP at a distal end of the objective lens 350) is moved from/not at the reference position RP, this corresponds to a movement of objective lens 350 from the rest position RP. As noted above, similar reference points and rest positions may be designated for other components (e.g., in relation to a reference point on the base portion 356 moving in relation to a reference position as located on or in relation to the motion mechanism holding portion 346, etc.)

In various implementations, the motion portion MP1 is further configured to move the objective lens 350 in a negative axial direction NAD and/or in a direction opposite to the perpendicular direction PRD, to move the objective lens 350 back to the rest position RP when the objective lens 350 is moved away from the workpiece 20 or other object with which contact was made (i.e., when the contact ceases). For example, the motion portion MP1 may comprise a force component FC1 formed of a flexible element 360 (e.g., a spring) which is configured to enable the movement in the positive axial direction PAD and/or perpendicular direction PRD and which provides a force to move the objective lens 350 back (e.g., in the negative axial direction NAD and/or in a direction opposite to the perpendicular direction PRD) toward the rest position RP. In various implementations, the force component FC1 correspondingly provides a force to maintain the objective lens 350 in the rest position RP (i.e., during normal operating conditions for image acquisitions, measurements, etc.) until a contact occurs.

In exemplary implementations, the flexible element 360 comprises a spring, such as a coil spring. In various implementations, the force component FC1 comprising the flexible element 360 is configured to be compressed to enable the movement in the positive axial direction PAD and decompressed to enable the movement in the negative axial direction NAD. In exemplary implementations as illustrated in FIGS. 4A and 4B, the motion portion MP1 may comprise the base portion 356 and a top element 357, wherein the flexible element 360 is configured to be located between the base portion 356 and the top element 357, and the base portion 356 is configured to move in the positive axial direction PAD and press against the flexible element 360 to compress the flexible element 360 between the base portion 356 and the top element 357. In various implementations, the positive and negative axial directions PAD and NAD may be generally parallel to the Z-axis, and the perpendicular direction PRD may generally lie within an XY plane.

In various implementations, the base portion 356 comprises a lens coupling portion LCP which is configured to be rigidly coupled to the objective lens 350, specifically, to an upper attachment portion UAP of the objective lens 350 (FIG. 3). In various implementations, the lens coupling portion LCP may include a hole with a securing element or other configuration capable of receiving and fixedly holding the upper attachment portion UAP of the objective lens 350. Various types of lens coupling configurations are known in the art. For example, an upper attachment portion UAP having a threaded portion may screw into a corresponding threaded hole of the lens coupling portion LCP, or the upper attachment portion UAP having a ring portion may be locked into a corresponding hole of the lens coupling portion LCP by a securing element or configuration, etc.

In various implementations, the objective lens 350 is configured to be in the rest position RP (e.g., relative to the camera system 260 and/or the base portion 356 or other reference portion) when a sufficient corresponding force is not applied by a contact with a workpiece 20 or other object (e.g., such as the stage 210, etc.) to move the objective lens 350 from the rest position RP. In the illustrated examples, the rest position RP is in relation to a central end point CEP at the distal end of the objective lens 350, such that if the objective lens is moved (e.g., if the central end point CEP is moved) in the positive axial direction PAD and/or the perpendicular direction PRD (i.e., in relation to the motion mechanism holding portion 346 and/or the camera system 260, etc.), the central end point CEP will no longer be at the rest position RP. In relation to the illustrated coordinate system, movement in the positive axial direction PAD and the negative axial direction NAD generally indicate movement primarily parallel with the Z axis, and movement in the perpendicular direction PRD generally indicates movement primarily in the X axis and/or Y axis directions.

In various implementations, as partially illustrated in FIGS. 3, 4A and 4B, the base portion 356 is coupled to the motion mechanism holding portion 346 as part of a kinematic coupling configuration KN1, for which the motion portion MP1 comprises the kinematic coupling configuration KN1. As is known in the art, a kinematic coupling configuration is generally designed to exactly constrain two mating parts, providing precision and location certainty. One type of kinematic coupling configuration is a Maxwell kinematic coupling configuration, which may be utilized for the kinematic coupling configuration KN1. As is known in the art, a Maxwell kinematic coupling configuration has three radial V-shaped grooves (oriented relative to a center of a part) in one part that mate with three curved surfaces (e.g., of balls, hemispheres, spherical portions, etc.) in another part. Each curved surface when mated with a V-shaped groove has two contact points for a total of six contact points, enough to constrain all six of the part's degrees of freedom. This design benefits from symmetry and therefore can take advantage of easier manufacturing techniques. Also, the Maxwell coupling is thermally stable due to its symmetry, as the curved surfaces can expand or contract in unison in the V-shaped grooves.

Figure 5:
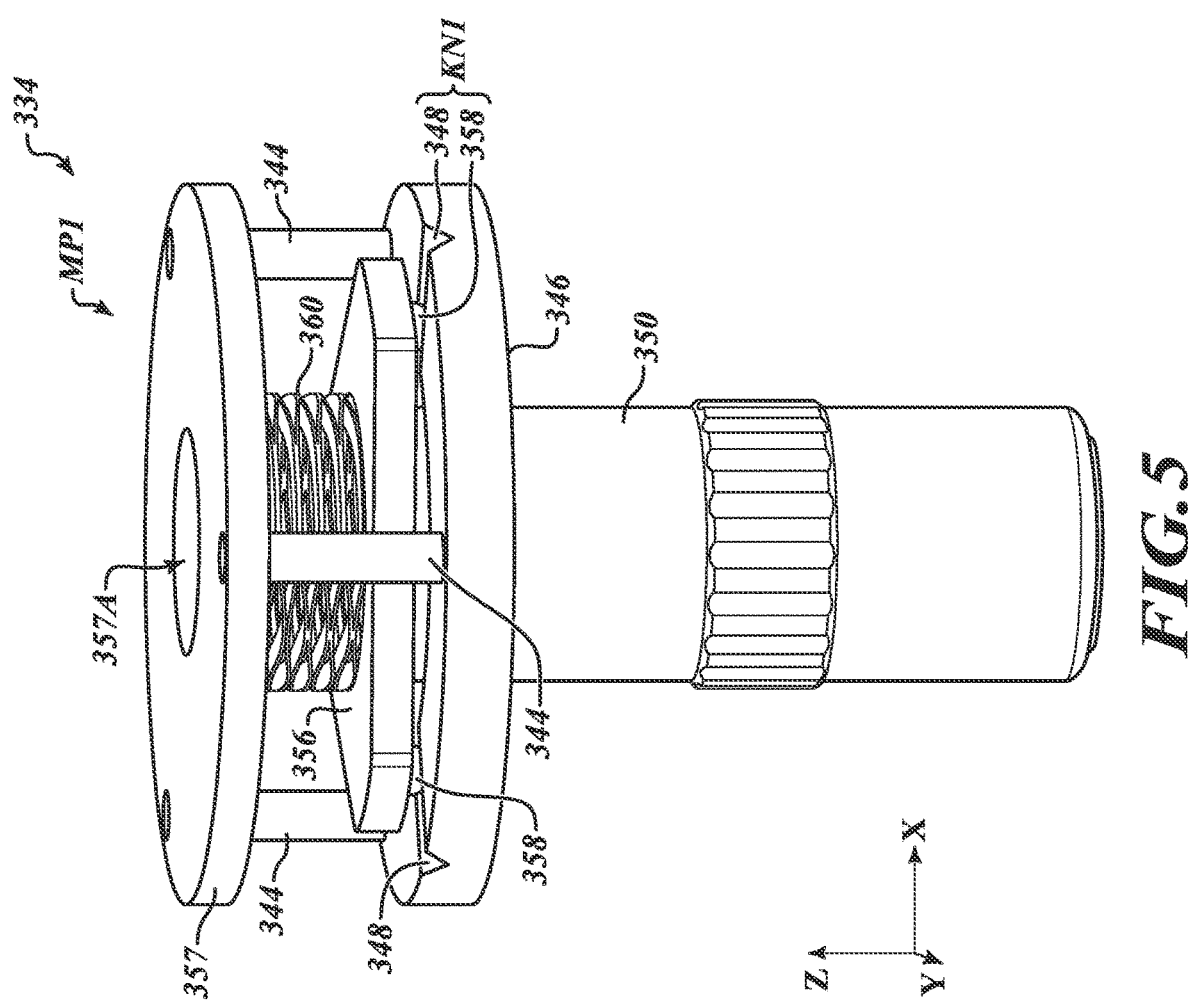
FIG. 5 is a diagram of a front isometric view of the lens motion mechanism of FIGS. 4A and 4B.
Figure 6:
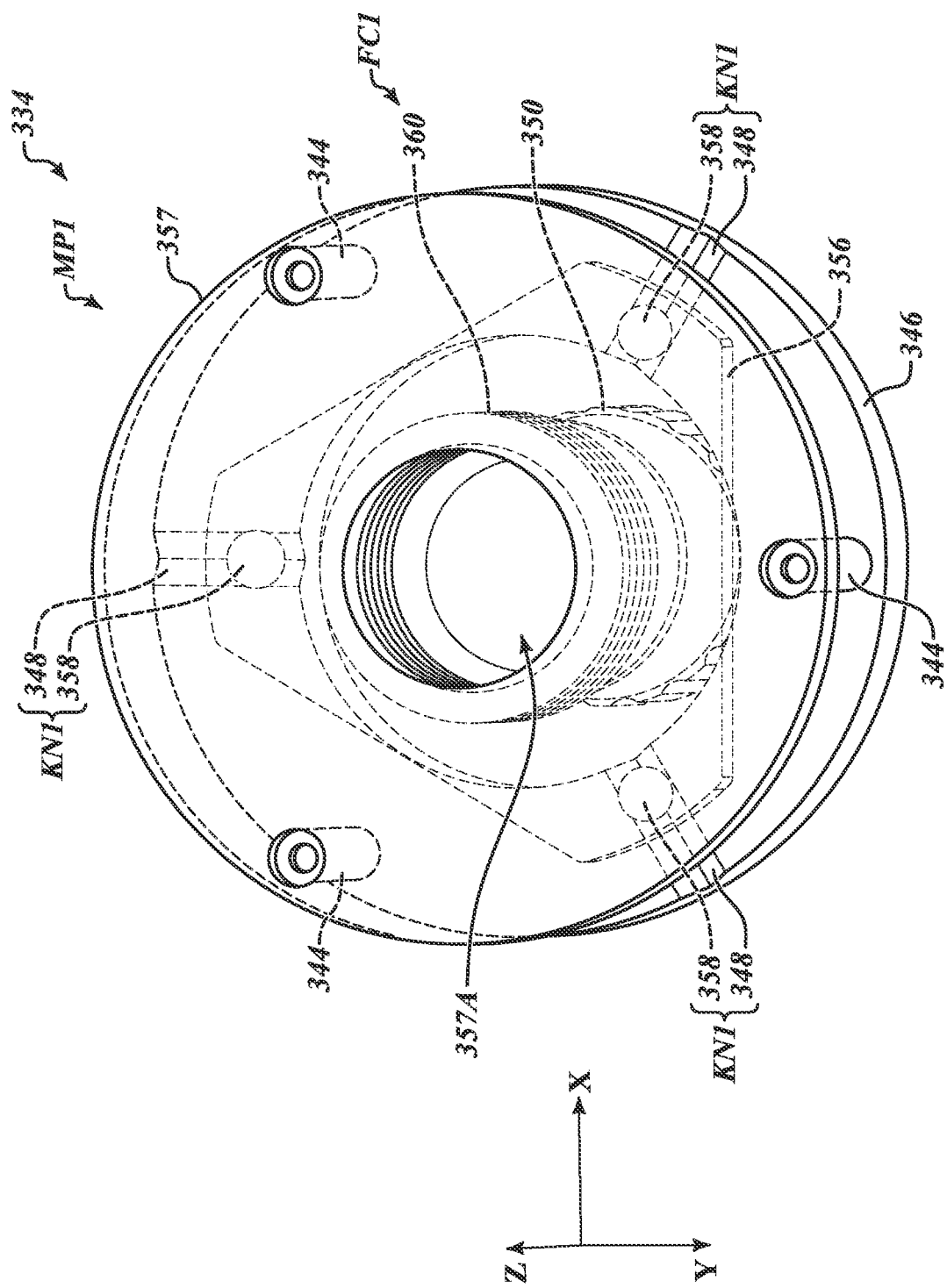
FIG. 6 is a diagram of a top isometric view of the lens motion mechanism of FIGS. 4A and 4B.

The configuration of the lens motion mechanism 334 including the kinematic coupling configuration KN1 will be more fully described in additional reference to FIGS. 5 and 6. FIGS. 5 and 6 are diagrams of front and top isometric views, respectively, of the lens motion mechanism 334 of FIGS. 4A and 4B. In various implementations, the kinematic coupling configuration KN1 (e.g., a Maxwell kinematic coupling configuration) comprises a set of three radial V-shaped grooves 348 (see FIG. 6) disposed at an interval of 120 degrees in the circumferential direction in one part (e.g., in the motion mechanism holding portion 346) that mate with a set of three curved surfaces 358 (e.g., surfaces of respective balls) disposed at an interval of 120 degrees in the circumferential direction in another part (e.g., in the base portion 356).

In various implementations, the base portion 356 includes attachment portions 358AP where the balls with curved surfaces 358 attach (FIG. 4B). When assembled, the curved surfaces 358 of the balls rest in the V-shaped grooves 348 of the motion mechanism holding portion 346. In the illustrated examples, each V-shaped groove 348 points in the negative axial direction NAD (e.g., as may be referenced as a right side up V). Support elements 344 couple the top element 357 to the motion mechanism holding portion 346.

In various implementations, when there is contact in the perpendicular direction PRD with resulting motion in the X and/or Y axis directions, such as illustrated in FIGS. 3, 4A and 4B, the base portion 356 may tilt/pivot in relation to the holding portion 346. For example, one or two of the curved surfaces 358 of the kinematic coupling configuration KN1 may be tilted up out of the corresponding groove 348 while the other one or two curved surfaces 358 may remain in their corresponding grooves 348 as the pivot point(s)).

According to the exemplary configurations and assemblies described above, the kinematic coupling configuration KN1 achieves high positioning reproducibility of the base portion 356 (and thus the objective lens 350) with respect to the motion mechanism holding portion 346. Such characteristics are desirable in high precision machine vision inspection systems configured to determine measurements in the micron or sub-micron range, for example. In some such implementations, the objective lens 350 may have certain characteristics for which the high positioning reproducibility is related to the high accuracy measurements. As an example, the objective lens 350 may in some instances have certain lens aberrations and/or other imperfections that may be addressed by calibration or other techniques (e.g., as described in U.S. Pat. No. 8,534,113, which is hereby incorporated herein by reference in its entirety), which are based at least in part on the angular or other orientation of the objective lens 350. The high positioning reproducibility for the objective lens 350 helps ensure that such techniques may be accurately applied for achieving the high precision measurements of the system.

In various implementations, the objective lens 250, 350 is configured to be coupled to the machine vision inspection system and oriented with an optical axis OA of the objective lens 250, 350 parallel to a z-axis of the machine vision inspection system, as shown in FIG. 2. In various implementations, the objective lens 250, 350 is configured to be moved by the machine vision inspection system 10, 100 in a downward direction (e.g., utilizing the movement mechanisms 294Z), which may cause the objective lens 250, 350 to contact a workpiece 20 or other object (e.g., the stage 210). This results in a force in the positive axial direction PAD to the objective lens 250, 350, for which the motion portion MP1 enables motion of the objective lens 250, 350 from the rest position RP in the positive axial direction PAD. In various implementations, at least one sensor portion SEN1 (see FIGS. 3 and 7) is configured to sense the contact with the workpiece 20 or other object and to output a contact signal SIG1 (e.g., on a signal line 335) that indicates the contact with the workpiece 20 or other object.

Figure 7:
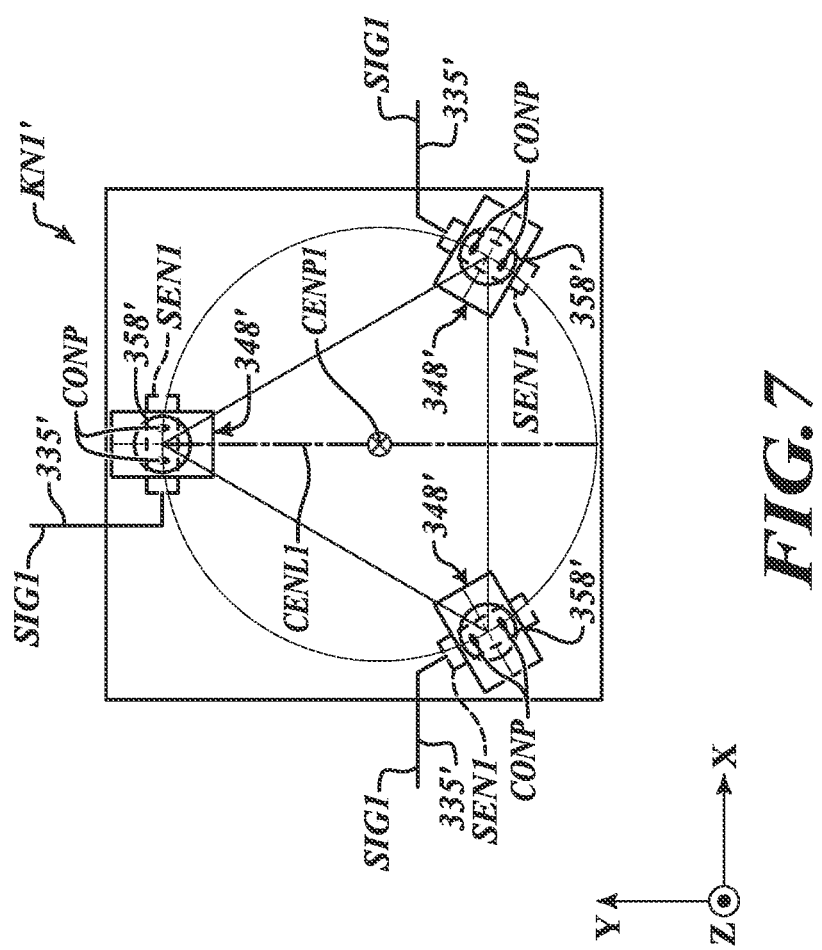
FIG. 7 is a cross-sectional top view of a kinematic coupling configuration that is illustrative of the principles of the kinematic coupling configuration of the lens motion mechanism of FIG. 6.

FIG. 7 is a cross-sectional top view of a kinematic coupling configuration KN1' that is illustrative of the principles of the kinematic coupling configuration KN1 of the motion mechanism 334. In one aspect, the kinematic coupling configuration KN1 as illustrated in FIG. 6 may be conceptually understood according to the kinematic coupling configuration KN1' of FIG. 7.

Specifically, FIG. 7 illustrates the kinematic coupling configuration KN1' which is configured to decouple in a decoupling direction to enable motion of the objective lens 350 from the rest position RP in the positive axial direction PAD when a corresponding force is applied by a contact with a workpiece 20 or other object. That is, the decoupling direction is the positive axial direction PAD in the illustrated example. The kinematic coupling configuration KN1' is configured to further enable high positioning reproducibility for the objective lens 350 returning to the rest position RP corresponding to motion of the objective lens 350 in the negative axial direction NAD to return to the rest position RP when the contact with the workpiece 20 or other object ceases. The kinematic coupling configuration KN1' includes three sets of V-shaped grooves 348' resting on curved surfaces 358', wherein each of the curved surfaces 358' may come in contact with the sides of the corresponding V-shaped groove 348' at two contact points CONP, at a total of six contact points CONP. As discussed above, six contact points CONP are enough to constrain six degrees of freedom of the objective lens 350 in various implementations. A center point CENP1 is defined as a central point of a triangle formed by the three sets of V-shaped grooves 348' and the curved surfaces 358', and a center line CENL1 extends from one of the three points of the triangle through the center point CENP1.

In the illustrated implementations (e.g., as illustrated in FIGS. 3 and 7), three sensor portions SEN1 sense when at least part of the base portion 356 moves away from the motion mechanism holding portion 346, as corresponding to motion of the objective lens 350 from the rest position RP. In one implementation, each sensor portion SEN1 senses when the corresponding curved surface 358 moves away from/breaks contact with the corresponding V-shaped groove 348 (i.e., so as to no longer be in contact at the two contact points CONP). In one implementation, a current may be provided through the contact points CONP, such that when contact is no longer maintained/is broken, an open circuit occurs which the sensor portion SEN1 may be configured to sense. Each sensor portion SEN1 has a signal line 335 (e.g., see FIGS. 2, 3 and 7) for providing a contact signal SIG1 which indicates when a contact (e.g., with a workpiece 20 or other object) has caused the objective lens 350 to move from the rest position RP. Various sensor technologies may be used to configure the one or more sensor portions SEN1 as will be apparent to those skilled in the art including, but not limited to, resistive sensors, Hall effect sensors, optical sensors, etc.

In various exemplary implementations, the contact signal SIG1 from the one or more sensor portions SEN1 may be used to trigger a stop function (e.g., an emergency stop) of the movement portion MVP or the entire machine vision inspection system 10, 100, to minimize any damage from a contact (e.g., corresponding to a collision) between the objective lens 250, 350 and other elements. To this end, as shown in FIG. 2, the motion control interface 132 may include a stop portion 132c. For example, in response to the determination that the objective lens 250, 350 has been moved from the rest position RP based on the contact signal SIG1, the stop portion 132c may control the movement portion MVP to stop the movement of the machine vision inspection system 10, 100 (e.g., to stop the movement that was adjusting the relative position between the optical assembly portion 205 and the workpiece 20). In various implementations, the operation of the one or more movement mechanisms 294Z and/or 294XY may be controlled to cease, to correspondingly stop the movement of the optical assembly portion 205 and/or of the workpiece stage 210. It will be appreciated that the disclosed configuration enables the contact to be quickly detected and for the stop function (e.g., the emergency stop effected by the stop portion 132c of FIG. 2) to be performed relatively quickly, which helps reduce the chance of any damage from the contact, etc. Such features thus help protect the objective lens 250, 350 and other components of the system, as well as the workpiece, etc. from potential damage from collisions, etc.

In various implementations, the disclosed configuration may enable motion of the objective lens 350 (e.g., from the rest position) over a certain range (e.g., corresponding to the movement before the flexible element 360, e.g., the spring, is fully compressed). In accordance with the disclosed operations, the stop function may be performed relatively quickly before the flexible element 360 reaches the end of its motion range (e.g., before the flexible element 360 is fully compressed). Such may be useful when the machine vision inspection system 10, 100 is utilizing the movement mechanism(s) 294Z and/or 294XY to perform relatively quick movements (e.g., for the inspection of a workpiece 20 for which high throughput for the inspection operations may be desired, etc.).

FIGS. 8A-8D are diagrams of a second implementation of a lens motion mechanism 334' with a motion portion MP1', and FIGS. 9A-9C are diagrams of a third implementation of a lens motion mechanism 334" with a motion portion MP1". The lens motion mechanisms 334' and 334" with the motion portions MP1' and MP1" will be understood to have certain similar components and to operate similarly to the lens motion mechanism 334 with the motion portion MP1 of FIGS. 3-7, except as otherwise described below. As some specific examples of the similarities, as part of the lens motion mechanisms 334' and 334" with the motion portions MP1' and MP1", a base portion 356'/356" is coupled to a motion mechanism holding portion 346'/346" (e.g., of the lens motion mechanism 334'/334") as part of a kinematic coupling configuration KN1. Similar to the configurations described above, the kinematic coupling configuration KN1 (e.g., a Maxwell kinematic coupling configuration) comprises a set of three radial V-shaped grooves 348 disposed at an interval of 120 degrees in the circumferential direction in one part (e.g., in the motion mechanism holding portion 346'/346") that mate with a set of three curved surfaces 358 (e.g., surfaces of respective balls) disposed at an interval of 120 degrees in the circumferential direction in another part (e.g., in the base portion 356'/356"). The locations of the curved surfaces 358 relative to certain other components are illustrated in part in the top views of FIGS. 8D and 9C.

The operations of the kinematic coupling configuration KN1 and related functions are similar to those described above for the kinematic coupling configuration KN1 of FIGS. 3-7, and for which the lens motion mechanism 334'/334" comprising the motion portion MP1'/MP1" is similarly configured to enable motion of the objective lens 350 from the rest position RP. More specifically, the objective lens 350 is coupled to the base portion 356'/356" which is configured to move in relation to the motion mechanism holding portion 346'/346" (e.g., in the positive axial direction PAD) and thus enable motion of the objective lens 350 from the rest position RP when a corresponding force (e.g., in the positive axial direction PAD) is applied by a contact of the objective lens 350 with a workpiece 20 or other object (e.g., the stage 210, etc.). Also similarly, three sensor portions SEN1 sense when at least part of the base portion 356'/356" moves away from the motion mechanism holding portion 346'/346", as corresponding to motion of the objective lens 350 from the rest position RP. To that end, each sensor portion SEN1 has a signal line 335 for providing a contact signal SIG1, which indicates when a contact (e.g., with a workpiece 20 or other object) has caused the objective lens 350 to move from the rest position RP. Other similarly labeled components will be understood to be similar and have similar operations to those described above with respect to FIGS. 3-7.

Referring to FIGS. 8A-8D, some differences of the lens motion mechanism 334' comprising the motion portion MP1' are that it includes a lens exchange retention configuration RC and does not include the flexible element 360 (e.g., spring). More specifically, FIGS. 8A and 8C are diagrams of partially cross-sectional front views of portions of the lens motion mechanism 334' with the motion portion MP1' as illustrating a lens exchange retention configuration RC and a guide configuration GC, respectively. FIG. 8B is an enlarged view of the retention configuration RC of FIG. 8A, and FIG. 8D is a top view of the base portion 356'. As noted above, the lens motion mechanism 334' with the motion portion MP1' will be understood to have certain similar components and to operate similarly to the lens motion mechanism 334 with the motion portion MP1 of FIGS. 3-7, except as otherwise described below.

As illustrated in FIGS. 8A, 8B and 8D, the motion portion MP1' includes the lens exchange retention configuration RC comprising retention components 863 (e.g., including electromagnets) that are configured to be controlled (e.g., by the control system portion 120 of FIG. 2 as providing a control signal SIG2, such as a signal and/or current, on a signal line 336) to provide a retention force to retain the base portion 356' in a fixed position in relation to the motion mechanism holding portion 346', such as during a lens exchange process. In various implementations, each of the three retention components 863 in the motion mechanism holding portion 346' (e.g., the electromagnets with positions as indicated in FIG. 8D) may include copper windings 864 as surrounding an iron core 865, and may operate to attract a permanent magnet 862 in the base portion 356'. Rather than the permanent magnet 862, in an alternative configuration as illustrated in FIGS. 9A-9C, an iron core 968 in the base portion 356" is attracted by the retention components 863/963 (e.g., electromagnets) as will be described in more detail below.

As part of a lens exchange process, the objective lens 350 is decoupled from the base portion 356' (e.g., the upper attachment portion UAP is decoupled from the lens coupling portion LCP) and is replaced with another (replacement) objective lens that is to be coupled to the base portion 356' in place of the objective lens 350. As part of the lens exchange process (e.g., for which a threaded portion of the upper attachment portion UAP of the first objective lens 350 may be unscrewed from the lens coupling portion LCP to be removed, and the replacement objective lens may be screwed into place, or for which other mounting configurations may be utilized), it may be desirable to have the base portion 356' temporarily fixed in position in relation to the holding portion 346'. This is accomplished by the lens exchange retention configuration RC, which thus avoids any undesired effects such as stresses on the otherwise moving components and/or on other operations of the lens motion mechanism 334' while the objective lenses are being exchanged/interchanged.

In various implementations, the permanent magnet 862 in the base portion 356' also functions as a force component FC2 that is configured to provide a force (i.e., through attraction to the iron core 865 in the motion mechanism holding portion 346') to maintain the objective lens 350 in the rest position RP (i.e., during normal operating conditions for image acquisitions, measurements, etc.) until a contact occurs (e.g., similar to part of the operation of the flexible element 360 of FIGS. 3-6 which functions as a force component FC1 for a similar purpose). It is noted that the components may be configured to provide a low enough force so as to enable the objective lens 350 to be moved from the rest position RP by a relatively low impact contact (e.g., to avoid damage to the objective lens 350 and/or other components, etc.). As noted above, during a lens exchange process, the retention configuration RC with the retention components 863 (e.g., electromagnets) may be used to increase the force (i.e., the attractive force to the permanent magnet 862) so that the base portion 356' stays in a rest position (e.g., stays in a fixed position) relative to the motion mechanism holding portion 346' throughout the lens exchange process.

As illustrated in FIGS. 8C and 8D, the lens motion mechanism 334' further includes guide configurations GC (e.g., which help guide the base portion 356' back to the rest position after a contact occurs, and which otherwise help prevent possible misalignments between the base portion 356' and the motion mechanism holding portion 346'). FIG. 8C provides a general representation of a guide configuration GC, wherein each guide configuration GC includes a guide pin component 866 (e.g., as attached to the motion mechanism holding portion 346') and a guide hole 867 (e.g., in the base portion 356'). FIG. 8D illustrates an example of the relative locations of the three guide configurations GC (866, 867) in relation to the other components.

As noted above, the guide configurations GC provide guidance for returning the base portion 356' back to the rest position relative to the motion mechanism holding portion 346'. This includes returning the three curved surfaces 358 to the three V-shaped grooves 348 within a certain tolerance, for which the curved surfaces 358 may then self-guide into the more precise positions within the V-shaped grooves 348, as part of the operations of the kinematic coupling configuration KN1 as described above. In various implementations, the guide pin components 866 are tapered such that they do not impede the motion of the base portion 356' as it becomes dislocated/displaced (e.g., relative to the motion mechanism holding portion 346') for movement from the rest position (e.g., in one example particularly as the base portion 356' pivots/tilts around two of the curved surfaces 358 and as the third curved surface 358 lifts away from the corresponding V-shaped groove 348, such as may occur as a result of a contact in the perpendicular direction PRD as described above with respect to FIGS. 3, 4A and 4B). It will be appreciated that in the illustrated configuration at least part of the restoring force for returning the base portion 356' to the rest position is provided by gravity and the mass of the objective lens 350 as coupled to the base portion 356' as well as the low central center of gravity.

As noted above, FIGS. 9A-9C are diagrams of a third implementation of a lens motion mechanism 334", which has certain similarities to the lens motion mechanism 334' of FIGS. 8A-8D, except as otherwise described below. Some differences of the lens motion mechanism 334" comprising the motion portion MP1" are that it includes a lens exchange retention configuration RC' which includes an iron core 968 rather than a magnet 862, and does not include guide configurations GC, as illustrated in FIGS. 9A-9C. More specifically, FIG. 9A is a diagram of a partially cross-sectional front view of a portion of the lens motion mechanism 334" with the motion portion MP1", FIG. 9B is a view of the retention configuration RC', and FIG. 9C is a top view of the base portion 356". As noted above, the lens motion mechanism 334" with the motion portion MP1" will be understood to have certain similar components and to operate similarly to the lens motion mechanisms 334 and 334' with the motion portions MP1 and MP1' of FIGS. 3-8D, except as otherwise described below.

As illustrated in FIGS. 9B and 9C, the motion portion MP1" includes the lens exchange retention configuration RC' comprising retention components 963 (e.g., including electromagnets) that are configured to be controlled (e.g., by the control system portion 120 of FIG. 2 as providing a control signal SIG2, such as a current or signal, on a signal line 336) to provide a retention force to retain the base portion 356" in a fixed position in relation to the motion mechanism holding portion 346" (e.g., such as during a lens exchange process, similar to that described above with respect to FIGS. 8A-8D). In various implementations, each of the three retention components 963 in the motion mechanism holding portion 346" (e.g., the electromagnets with positions as indicated in FIG. 9C) may include copper windings 964 as surrounding an iron core 965, and may operate to attract the corresponding iron core 968 in the base portion 356" (i.e., which is noted to be a difference from the configuration of FIGS. 8A-8D where the attraction was to a permanent magnet 862 in the base portion 356'). Similar to the lens exchange process as described above, it may be desirable to have the base portion 356" temporarily fixed in position in relation to the holding portion 346" as accomplished by the lens exchange retention configuration RC', to avoid any undesired effects such as stresses on the otherwise moving components and/or on other operations of the lens motion mechanism 334" (e.g., while objective lenses are being exchanged/interchanged, etc.).

As illustrated in FIG. 9A, flexible elements 961 (e.g., extension springs) function as force components FC3 that are configured to provide a force to maintain the objective lens 350 in the rest position RP (i.e., during normal operating conditions for image acquisitions, measurements, etc.) until a contact occurs (e.g., similar to part of the operation of the flexible element 360 of FIGS. 3-6, such as a compression spring, which functions as a force component FC1 for a similar purpose). It is noted that the flexible elements 961 may be configured with a low enough force so as to enable the objective lens 350 to be moved from the rest position by a relatively low impact contact (e.g., to avoid damage to the objective lens 350 and/or other components, etc.). As noted above, during a lens exchange process, the retention configuration RC' with the retention components 963 (e.g., electromagnets) may be used to provide an increased force, so that the base portion 356" stays in a rest position (e.g., stays in a fixed position) relative to the motion mechanism holding portion 346" throughout the lens exchange process.

The relative locations of the three flexible elements 961 in relation to the other components are indicated in part in FIG. 9C. As noted above, the flexible elements 961 help guide the base portion 356" back to the rest position relative to the motion mechanism holding portion 346" after a contact occurs, and otherwise help prevent possible misalignments between the base portion 356" and the motion mechanism holding portion 346". This includes returning the three curved surfaces 358 to the three V-shaped grooves 348 within a certain tolerance, for which the curved surfaces 358 may then self-guide into the more precise positions within the V-shaped grooves 348, as part of the operations of the kinematic coupling configuration KN1 as described above. In various implementations, the flexible elements 961 provide a low enough force such that they generally do not impede the motion of the base portion 356" as it becomes dislocated/displaced (e.g., relative to the motion mechanism holding portion 346") to move from a rest position (e.g., in one example particularly as the base portion 356' pivots/tilts around two of the curved surfaces 358 and as the third curved surface 358 lifts away from the corresponding V-shaped groove 348, such as may occur as a result of a contact in the perpendicular direction PRD as described above with respect to FIGS. 3, 4A and 4B).

It will be appreciated that in the illustrated configuration, at least part of the restoring force for returning the base portion 356" to the rest position is provided by gravity and the mass of the objective lens 350 as coupled to the base portion 356" as well as the low central center of gravity. In various implementations, the flexible elements 961 functioning as force components FC3 may be characterized as providing a relatively low force that operates similarly to the relatively low force provided by the permanent magnets 862 functioning as the force components FC2 of FIGS. 8A-8D for maintaining the objective lens 350 in the rest position until a contact occurs (e.g., and as providing at least some of the force for returning the base portion 356"/objective lens 350 to the rest position after a contact occurs).

In various implementations, the configurations described above with respect to FIGS. 3-9C, may generally not enable the objective lens 250, 350 to completely detach from the optical assembly portion 205 during normal measurement operations (e.g., such as a result of a general contact, and not as part of a lens exchange process). In certain implementations, such complete detachment (e.g., during normal measurement operations when a contact occurs) may be undesirable for a number of reasons (e.g., the objective lens 350 may be relatively heavy and may fall and/or could otherwise be damaged by such complete detachment and/or could damage the workpiece 20, stage 210, etc.). The disclosed configurations also enable the objective lens 250, 350 to be automatically recoupled back into the rest position relatively quickly so that measurement operations may resume, etc.

FIG. 10 is a flow diagram illustrating one embodiment of a general routine 1000 for operating a machine vision inspection system 10, 100 including a lens motion mechanism 334, 334' 334". The machine vision inspection system 10, 100 includes the movement portion MVP comprising one or more movement mechanisms (e.g., 294Z and 294XY) configured to adjust a relative position between the optical assembly portion 205 and a workpiece 20 (e.g., by moving the optical assembly portion 205 in the Z and/or X direction and/or moving the workpiece stage 210 that the workpiece 20 is located on in the Y and/or X directions). The optical assembly portion 205 (e.g., which may be moved by the movement mechanism 294Z) includes the camera system 260 that receives imaging light 255 transmitted along the imaging optical path OPATH and provides images of a surface of the workpiece 20. The optical assembly portion 205 includes the objective lens 250, 350 that inputs the imaging light 255 arising from the surface of the workpiece and transmits the imaging light 255 along the imaging optical path OPATH to the camera 260.

The method comprising the routine 1000 includes generally three steps 1010, 1020, and 1030. Step 1010 includes utilizing the movement portion MVP to adjust a relative position between the optical assembly portion 205 and the workpiece 20, for example, by moving the optical assembly portion 205 in the Z and/or X direction and/or moving the workpiece stage 210 that the workpiece 20 is located on in the Y and/or X directions. Step 1020 includes determining that the objective lens 250, 350 has been moved from a rest position RP (e.g., in a corresponding direction) as resulting from a corresponding force (e.g., in the direction) as applied by a contact with the workpiece 20 or other object. In this regard, the optical assembly portion 205 further comprises the lens motion mechanism 334, 334', 334" that includes the motion portion MP1, MP1', MP" that enables the motion of the objective lens 250, 350 from the rest position RP.

Step 1030 includes, in response to the determination that the objective lens 250, 350 has been moved from the rest position RP, utilizing the movement portion MVP to stop the movement of the machine vision inspection system 10, 100 (e.g., to stop the movement that was adjusting the relative position between the optical assembly portion 205 and the workpiece 20). For example, step 1030 may include ceasing the movement of the optical assembly portion 205 and/or of the workpiece stage 210 by ceasing the operation of the one or more movement mechanisms 294Z and/or 294XY, such as implemented by the stop portion 132c of FIG. 2. In accordance with various implementations, the determining that the objective lens 250, 350 has been moved from a rest position RP comprises receiving a contact signal SIG1 from a sensor portion SEN1 of the lens motion mechanism 334 that indicates that the objective lens 250, 350 has been moved from the rest position RP.

In accordance with various implementations, the method comprising the routine 1000 includes a further step of, after the stopping of the movement of the machine vision inspection system 10, 100, utilizing the movement portion MVP to move the optical assembly portion 205 including the objective lens 250, 350 away from the workpiece 20 or other object with which the contact was made. After the movement away, the motion portion MP1 enables movement of the objective lens 250, 350 back to the rest position RP.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A machine vision inspection system, comprising:
a movement portion comprising one or more movement mechanisms configured to adjust a relative position between an optical assembly portion and a workpiece; and
the optical assembly portion, wherein the optical assembly portion includes:
a camera that receives imaging light transmitted along an imaging optical path and provides images of a surface of the workpiece;
an objective lens that inputs the imaging light arising from the surface of the workpiece, and transmits the imaging light along the imaging optical path to the camera; and
a lens motion mechanism comprising a motion portion configured to enable motion of the objective lens from a rest position when a corresponding force is applied by a contact with the workpiece or other object, wherein the motion portion comprises a kinematic coupling configuration.

2. The system of claim 1, wherein the lens motion mechanism further comprises a sensor portion which provides a contact signal when the objective lens is moved from the rest position as a result of a contact.

3. The system of claim 2, wherein in response to the contact signal the movement portion is configured to cease adjusting a relative position between the optical assembly portion and the workpiece.

4. The system of claim 1, wherein the motion portion comprises a base portion which is configured to be coupled to the objective lens and which is configured to move in a positive axial direction when a corresponding force in the positive axial direction is applied by a contact with the workpiece or other object.

5. The system of claim 4, wherein the base portion is further configured to tilt to enable movement of a distal end of the objective lens in a perpendicular direction that is perpendicular to the positive axial direction, to move the objective lens from the rest position when a corresponding force in the perpendicular direction is applied by the contact with the workpiece or other object.

6. The system of claim 4, wherein the motion portion is further configured to enable movement of the objective lens in a negative axial direction and to provide a force to move the objective lens back to the rest position when the objective lens is moved away from the workpiece or other object with which there was a contact.

7. The system of claim 6, wherein the motion portion further comprises a force component which is coupled to the base portion and is configured to enable the movement in the positive axial direction and to provide a force to move the objective lens back in the negative axial direction toward the rest position.

8. The system of claim 7, wherein the force component comprises at least of a flexible element or a magnet.

9. The system of claim 7, wherein the motion portion further comprises a top element, wherein the force component is configured to be located between the base portion and the top element, and the base portion is configured to move in the positive axial direction and press against the force component to compress the force component between the base portion and the top element.

10. The system of claim 6, wherein:
the optical assembly portion further comprises a motion mechanism holding portion; and
the base portion is coupled to the motion mechanism holding portion as part of a kinematic coupling configuration.

11. The system of claim 6, wherein the base portion comprises a lens coupling portion which is configured to be rigidly coupled to an attachment portion of the objective lens.

12. The system of claim 1, wherein the kinematic coupling configuration is configured to decouple in a positive axial direction when a corresponding force in the positive axial direction is applied by a contact with the workpiece or other object.

13. The system of claim 1, wherein the kinematic coupling configuration comprises a set of three radial v-shaped grooves, which are disposed at an interval of 120 degrees in a circumferential direction in one part associated with the objective lens, that mate with a set of three curved surfaces, which are disposed at an interval of 120 degrees in the circumferential direction in another part associated with the lens motion mechanism.

14. The system of claim 1, wherein as part of an adjusting of the relative position between the optical assembly portion and the workpiece, the movement portion is configured to move the optical assembly portion including the objective lens in a downward direction which causes a contact with the workpiece or other object, which results in a force in a positive axial direction to the objective lens, for which the motion portion enables motion of the objective lens from the rest position in the positive axial direction.

15. The system of claim 1, wherein a movement of the objective lens from the rest position corresponds to at least one of:
a movement of the objective lens in relation to a motion mechanism holding portion of the lens motion mechanism; or
a movement of the objective lens in relation to the camera.

16. The system of claim 1, wherein:
the lens motion mechanism further comprises a motion mechanism holding portion; and
the motion portion comprises a base portion, to which the objective lens is coupled and which is configured to move in relation to the motion mechanism holding portion to thereby enable motion of the objective lens from the rest position when a corresponding force is applied by a contact of the objective lens with the workpiece or other object.

17. The system of claim 16, wherein the motion portion further comprises a lens exchange retention configuration comprising one or more retention components that are configured to be controlled to provide a retention force to retain the base portion in a fixed position in relation to the motion mechanism holding portion during a lens exchange process during which the objective lens is decoupled from the base portion and is replaced with another objective lens that is coupled to the base portion in place of the objective lens.

18. The system of claim 17, wherein each retention component of the one or more retention components comprises an electromagnet.

19. The system of claim 16, wherein the motion portion further comprises one or more force components that are configured to provide a force to maintain the objective lens in the rest position until a contact occurs.

20. The system of claim 19, wherein each force component of the one or more force components comprises at least one of a magnet or a flexible element.

21. A method for operating a machine vision inspection system,
the machine vision inspection system including:
a movement portion comprising one or more movement mechanisms configured to adjust a relative position between an optical assembly portion and a workpiece; and
the optical assembly portion, wherein the optical assembly portion comprises:
a camera that receives imaging light transmitted along an imaging optical path and provides images of a surface of the workpiece; and
an objective lens that inputs the imaging light arising from the surface of the workpiece and transmits the imaging light along the imaging optical path to the camera;
the method comprising:
utilizing the movement portion to adjust a relative position between the optical assembly portion and the workpiece;
determining that the objective lens has been moved from a rest position as resulting from a corresponding force as applied by a contact with a workpiece or other object, wherein the optical assembly portion further comprises a lens motion mechanism that includes a motion portion that enables the motion of the objective lens from the rest position, wherein the motion portion comprises a kinematic coupling configuration; and
in response to the determination that the objective lens has been moved from the rest position, utilizing the movement portion to stop the movement of the machine vision inspection system.

22. The method of claim 21, wherein the determining that the objective lens has been moved from the rest position comprises receiving a contact signal from a sensor portion of the lens motion mechanism that indicates that the objective lens has been moved from the rest position.

23. The method of claim 21, further comprising:
after the stopping of the movement of the machine vision inspection system, utilizing the movement portion to move the optical assembly portion including the objective lens away from the workpiece or other object with which the contact was made, wherein after the movement away, the motion portion enables movement of the objective lens back to the rest position.

24. A lens motion mechanism for utilization in a machine vision inspection system,
the machine vision inspection system including:
a movement portion comprising one or more movement mechanisms configured to adjust a relative position between an optical assembly portion and a workpiece; and the optical assembly portion, wherein the optical assembly portion comprises:
- a camera that receives imaging light transmitted along an imaging optical path and provides images of a surface of the workpiece; and
- an objective lens that inputs the imaging light arising from the surface of the workpiece and transmits the imaging light along the imaging optical path to the camera;

the lens motion mechanism comprising:
- a motion portion configured to enable motion of the objective lens from a rest position when a corresponding force is applied by a contact with a workpiece or other object, wherein the motion portion comprises a kinematic coupling configuration.

25. The lens motion mechanism of claim 24, wherein the kinematic coupling configuration is configured to decouple in a positive axial direction when a corresponding force in the positive axial direction is applied by a contact with the workpiece or other object.

\* \* \* \* \*